US011455084B2

(12) United States Patent
Tetro et al.

(10) Patent No.: US 11,455,084 B2
(45) Date of Patent: Sep. 27, 2022

(54) SYSTEM FOR BUILDING SIMULTANEOUS INTERACTIVE EXPERIENCES

(71) Applicant: ForgeDX LLC, Salt Lake City, UT (US)

(72) Inventors: Cydni Rogers Tetro, Cedar Hills, UT (US); Robyn A. Erkelens, Salt Lake City, UT (US); Jeffrey Day, Commerce Township, MI (US); Jay Williams, Salt Lake City, UT (US); Deirdre Olsen, Millcreek, UT (US)

(73) Assignee: ForgeDX LLC, Salt Lake City, UT (US)

(*) Notice: Subject to any disclaimer, the term of this patent is extended or adjusted under 35 U.S.C. 154(b) by 0 days.

(21) Appl. No.: 17/006,212

(22) Filed: Aug. 28, 2020

(65) Prior Publication Data

US 2021/0064201 A1    Mar. 4, 2021

Related U.S. Application Data

(60) Provisional application No. 62/892,692, filed on Aug. 28, 2019.

(51) Int. Cl.
*G06F 3/0484* (2022.01)
*H04L 41/22* (2022.01)
*G06F 9/455* (2018.01)

(52) U.S. Cl.
CPC .......... *G06F 3/0484* (2013.01); *G06F 9/455* (2013.01); *H04L 41/22* (2013.01)

(58) Field of Classification Search
CPC ...... G06F 3/0484; G06F 3/0481; G06F 9/455; G06F 9/451; H04L 41/22
See application file for complete search history.

(56) References Cited

U.S. PATENT DOCUMENTS

| 7,577,909 | B2* | 8/2009 | Harriger | G06F 9/451 |
| | | | | 715/744 |
| 8,108,201 | B2* | 1/2012 | Ragnunath | G06F 9/45537 |
| | | | | 703/24 |
| 8,595,053 | B1* | 11/2013 | Klayman | G07C 13/00 |
| | | | | 235/386 |
| 9,836,193 | B2* | 12/2017 | Ligman | G06F 3/0484 |
| 10,229,094 | B2* | 3/2019 | Rumsey | G06F 40/30 |

(Continued)

OTHER PUBLICATIONS

Hagiwara et al., "Measuring participants' immersion in healthcare simulation: the development of an instrument," Advances in Simulation, 1:17, May 23, 2016, 9 pgs.

(Continued)

*Primary Examiner* — Nicholas Klicos
(74) *Attorney, Agent, or Firm* — Patent Law Works

(57) ABSTRACT

A system and method for receiving, using one or more processors, a set of sequences including a first sequence; receiving, using the one or more processors, a set of content associated with the first sequence, the set of content including first content associated with a first panel and second content associated with a second panel; receiving, using the one or more processors, a set of interactions associated with the first sequence, the set of interactions including a first trigger; and generating, using the one or more processors, a simulation based on the received set of sequences, the set of content, and the set of interactions.

20 Claims, 19 Drawing Sheets

(56) References Cited

U.S. PATENT DOCUMENTS

| | | | |
|---|---|---|---|
| 2002/0087300 A1* | 7/2002 | Patwari | G06F 3/0481 |
| | | | 703/22 |
| 2002/0169591 A1* | 11/2002 | Ryzl | G06F 8/20 |
| | | | 703/24 |
| 2004/0210923 A1 | 10/2004 | Hudgeons et al. | |
| 2006/0236261 A1 | 10/2006 | Forstall et al. | |
| 2007/0300185 A1* | 12/2007 | Macbeth | G06F 9/451 |
| | | | 715/825 |
| 2008/0005418 A1* | 1/2008 | Julian | H04Q 9/00 |
| | | | 710/62 |
| 2008/0134260 A1 | 6/2008 | Glassman et al. | |
| 2008/0307312 A1* | 12/2008 | Misra | G06F 8/38 |
| | | | 715/733 |
| 2010/0064244 A1* | 3/2010 | Kilpatrick, II | G06F 1/1649 |
| | | | 715/773 |
| 2013/0196765 A1* | 8/2013 | Wolff-Petersen | A63F 13/21 |
| | | | 463/36 |
| 2014/0026113 A1* | 1/2014 | Farooqi | G06F 8/34 |
| | | | 717/107 |
| 2014/0075371 A1* | 3/2014 | Carmi | G06F 9/451 |
| | | | 715/781 |
| 2014/0081616 A1* | 3/2014 | Poulin | G06F 11/3457 |
| | | | 703/22 |
| 2014/0087712 A1* | 3/2014 | Danford | H04L 41/0893 |
| | | | 455/419 |
| 2014/0337072 A1 | 11/2014 | Tamblyn et al. | |
| 2015/0339415 A1* | 11/2015 | Klein | G06F 30/20 |
| | | | 703/6 |
| 2016/0062555 A1 | 3/2016 | Ward et al. | |
| 2016/0335348 A1* | 11/2016 | Desineni | G06F 3/04847 |
| 2016/0335643 A1* | 11/2016 | Trunick | G06Q 30/01 |
| 2017/0277891 A1* | 9/2017 | Keppler | G06F 21/552 |
| 2018/0052646 A1* | 2/2018 | Capt | G09F 9/33 |
| 2019/0324890 A1* | 10/2019 | Li | G06F 11/3664 |

OTHER PUBLICATIONS

International Search Report and Written Opinion for International Application No. PCT/US2020/048479, dated Dec. 3, 2020, 12 pgs.

\* cited by examiner

ForgeDX Sales Simulation — Approve  Save  Export  View PDF  Preview

S1 – Features | Sequence 1 - Setup | Simulation Features –

Details –

Sequence Name [Setup 402]

Sequence ID [404]

Orientation 406
[ ⃝ ▢ ▢ ]

Script –

*Start writing....* 412

Interactions 414 –

+ Add Interaction

Comments –

*Leave a comment...*

Post

---

Sequence Details

Introductory overview of product and simulation objective

S1 - LEFT 408

Label [ForgeDX Logo]

Description [ForgeDX Logo]

Copy [ ]

Media
[Upload Media]  [Add URL]

Design –
*Start writing...*

---

S1 - RIGHT 410

Label [ForgeDX Graphic]

Description [ForgeDX Graphic]

Copy [ ]

Media
[Upload Media]  [Add URL]

Design –
*Start writing...*

---

Simulation Details –

Title [ForgeDX Simulation]

Card [ ]

Background ● #060505

App Icon [ ] Upload Image
○ Display Multi Horizontally

Overview
*Start writing.....*

Upload Script PDF
Upload

Tags [ ] *separate values by comma
○ AutoRun

○○○ Sequences –
+ Add sequence

[ S1 - Setup ]

Figure 4A

| Trigger Details | | | Left Display | | | Right Display | | |
|---|---|---|---|---|---|---|---|---|
| T# | Trigger Name | Trigger ID | Content Type | Content Description | Image Name | Content Type | Content Description | Image Name |
| 1 | Title | title | image | Title | t1_left.png | Video - looping | Title video | t1_right.mp4 |
| 2 | Setup | chapters | image | Chapters | t2_left.png | image | Quote | t2_right.png |
| 3 | Chapter 1 setup | chapter1 | image | Chapter 1 Setup | t3_left.png | image | desktop and login | t3_right.png |
| 4 | Secure Network Connection | secure-network | image | Chapter 1, Timeline 1 | t4_left.png | image | Calendar alert | t4_right.png |

| Trigger Details | | | Left Display | | | Right Display | | |
|---|---|---|---|---|---|---|---|---|
| \<colspan=3\> These are the things the identify and cause the trigger to fire. The Click Event is what the user should click to trigger this specific content sequence. | | | \<colspan=3\> This is the content you expect to see when the trigger is activated. | | | | | |
| T# | Trigger Name | Trigger ID | Content Type | Content Description | Image Name | Content Type | Content Description | Image Name |
| Ex | Example Name | example-id | Video (looping Y or N) | Basket Animation | t#_left | Tech Stock | Basket Animation | example_id_right |
| Ex | Example Name | example-here | Image | Digital Signage | t#_left | Tech Architecture | Digital Signage | example-here |
| Ex | Example Name | example-again | Iframe | Site Homepage | t#_left | Bullets | Site Homepage | example_again_right |

| | Trigger Details | | | | | Left Display | | | | Mobile App Display | | | | Right Display | | |
|---|---|---|---|---|---|---|---|---|---|---|---|---|---|---|---|---|
| | These are the things that identify and cause the trigger to fire. The Click Event is what the user should click to trigger this specific content sequence. | | | | | | | | | This is the content you expect to see when the trigger is activated. | | | | | | |
| T# | Trigger Type | Trigger Name | Trigger ID | Trigger Source | Click Event | Content Type | Content Description | Image Name | Image Description | Content Description | Screen Name | Notification Text | Content Type | Content Description | Image Name |
| Ex | Attest one Trigger | Example Name | example-id | Mobile App | Download App1 button | Video (looping Y or N) | Basket Animation | t#_left | Faked notification from Outlook | | SB_notification_screen | Welcome to Market1 | Tech Stack | Basket Animation | example_id_right |
| Ex | Interaction Trigger | Example Name | example-here | Cloud App | Trigger Dot | Image | Digital Signage | t#_left | NA | | NA | NA | Tech Architecture | Digital Signage | example-here |
| Ex | Interaction Trigger | Example Name | example-again | Cloud App | Login Button on iframe in Left display | Iframe | Site Homepage | t#_left | Welcome screen on TV | | s42_welcome_tv | Hello Aaron! Your appointment has been booked. | Bullets | Site Homepage | example_again_right |

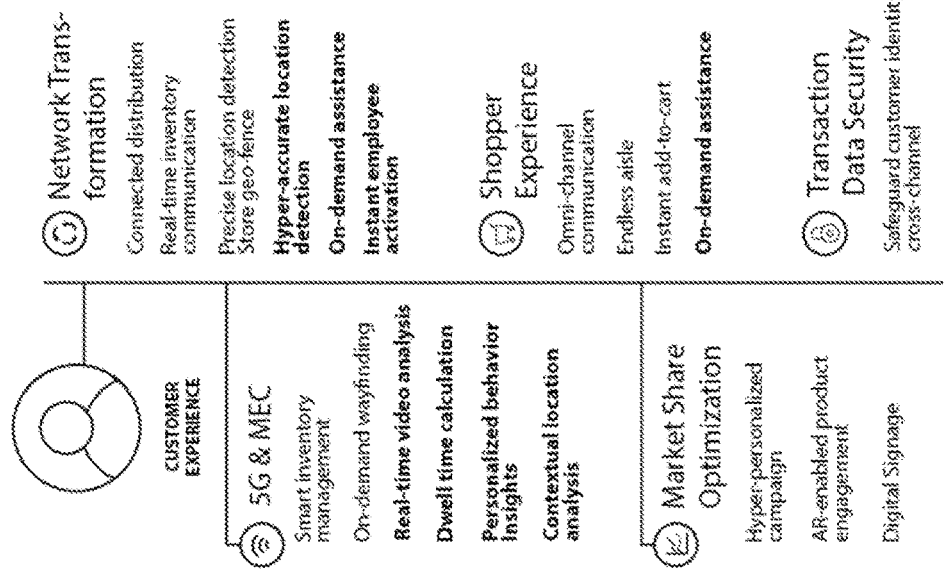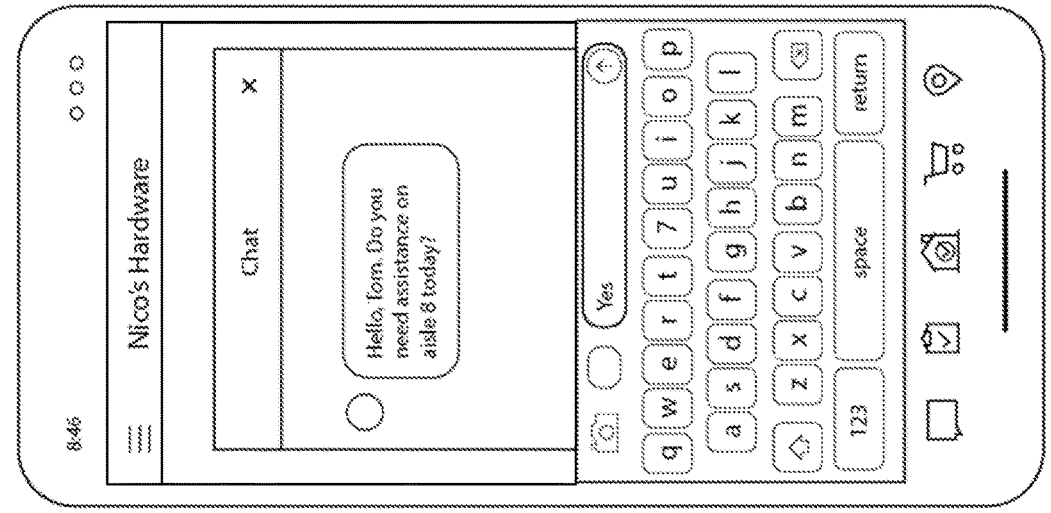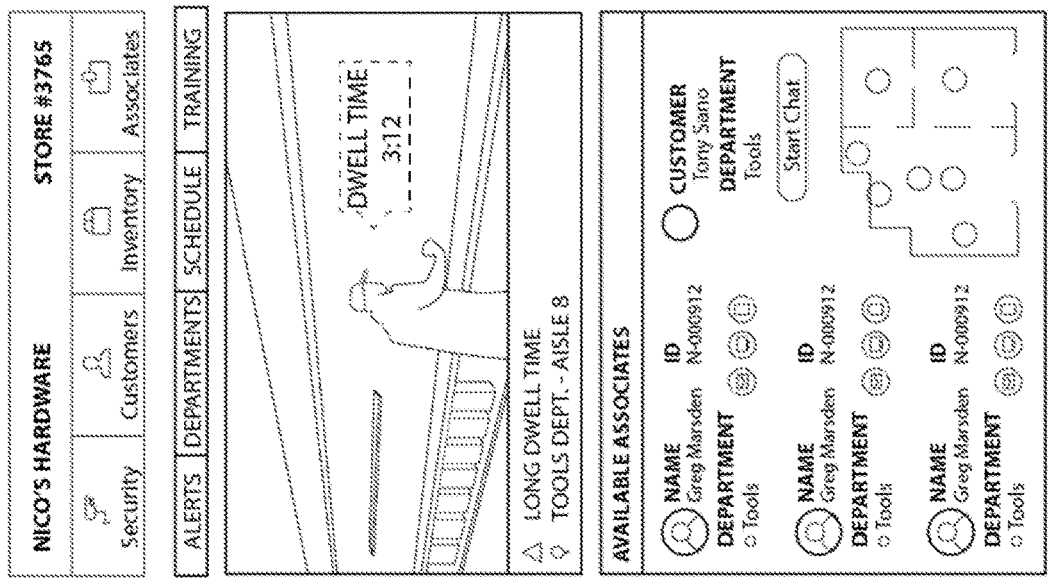
Figure 11

SYSTEM FOR BUILDING SIMULTANEOUS INTERACTIVE EXPERIENCES

CROSS-REFERENCE TO RELATED APPLICATIONS

The present application claims priority to U.S. Provisional Application No. 62/892,692, filed Aug. 28, 2019, titled "System for Building Simultaneous Interactive Experiences," the entirety of which is hereby incorporated by reference.

BACKGROUND

A video may present features and functionality of an application in a prescript and fixed order, which does not allow deviation or adaption to a viewer's particular interests. PowerPoint presentations may present features and functionality of an application, and allow some adaptation of the presentation by allowing removal of slides, rearranging of slides, or skipping among slides. However, present solutions do not provide a simultaneous and dynamic interactive experience, much less allow a presenter to drive the experience across a variety of displays and devices, or leverage user experience data to modify and improve the experience over time.

SUMMARY

In general, an innovative aspect of the subject matter described in this disclosure may be embodied in methods that include receiving, using one or more processors, a set of sequences including a first sequence; receiving, using the one or more processors, a set of content associated with the first sequence, the set of content including first content associated with a first panel and second content associated with a second panel; receiving, using the one or more processors, a set of interactions associated with the first sequence, the set of interactions including a first trigger; and generating, using the one or more processors, a simulation based on the received set of sequences, the set of content, and the set of interactions.

According to another innovative aspect of the subject matter described in this disclosure, a system comprises a processor; and a memory storing instructions that, when executed, cause the system to: receive a set of sequences including a first sequence; receive a set of content associated with the first sequence, the set of content including first content associated with a first panel and second content associated with a second panel; receive a set of interactions associated with the first sequence, the set of interactions including a first trigger; and generate a simulation based on the received set of sequences, the set of content, and the set of interactions.

Other implementations of one or more of these aspects include corresponding systems, apparatus, and computer programs, configured to perform the actions of the methods, encoded on computer storage devices. These and other implementations may each optionally include one or more of the following features. Receiving, during presentation of the simulation, a first interaction, the first interaction associated with an interaction with a first user interface that is presented in the first panel; and responsive to the first interaction being the first trigger; presenting third content that is associated with the second panel. Determining, based on user input, whether to (a) present the first panel and the second panel using a single display device or to (b) present the first panel using a first display device and the second panel using a second display device; and presenting the first panel and the second panel based on the determination. Generating simulation user experience data includes supplementing the data regarding interactions with the simulation with timing data and context data; and generating actionable data based on an analysis of the simulation user experience data. Generating simulation user experience data includes supplementing the data regarding interactions with the simulation with timing data and context data; and generating multi-environment user experience data by combining the simulation user experience data with data received from one or more of a variety of environments including a live environment, a virtual environment, and a third party digital environment, the multi-environment user experience data including data regarding interactions in the variety of environments as well as timing data and context data corresponding to the interactions; and generating actionable data based on an analysis of the multi-environment user experience data. The first trigger is based on a manual user input via a client device, the client device being used, at least in part to drive the simulation. The first trigger is automatically executed as part of the simulation. Based on user input indicating a preference, one or more of (a) a first subset within the set of sequences, (b) a first subset within the set of interactions associated with the first sequence, and (c) the first trigger are responsive to manual user input via a client device; and where one or more of (a) a second subset within the set of sequences, (b) a second subset within the set of interactions associated with the first sequence, and (c) a second trigger are automatically executed. Based on simulation user experience data, one or more of (a) a first subset within the set of sequences, (b) a first subset within the set of interactions associated with the first sequence, and (c) the first trigger are responsive to manual user input via a client device; and where one or more of (a) a second subset within the set of sequences, (b) a second subset within the set of interactions associated with the first sequence, and (c) a second trigger are automatically executed.

It should be understood that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIG. 4A-B are illustrations of an example user interfaces for receiving a sequence and associated content according to some embodiments.

FIGS. 5A-C are example representations of trigger data according to some embodiments.

FIG. 11 illustrates an example user interface of a presentation of an example simulation according to one embodiment.

DETAILED DESCRIPTION

The techniques introduced herein overcome the deficiencies and limitations of the prior art at least in part by providing systems and methods for building simultaneous interactive experiences. It should be understood that language used in the present disclosure has been principally selected for readability and instructional purposes, and not to limit the scope of the subject matter disclosed herein.

The present disclosure describes systems and methods for building simultaneous interactive experiences. In the following descriptions, for purpose of explanation, numerous specific details are set forth in order to provide a thorough understanding of the present disclosure. However, it should be noted that the present disclosure might be practiced without these specific details.

Figure 1:
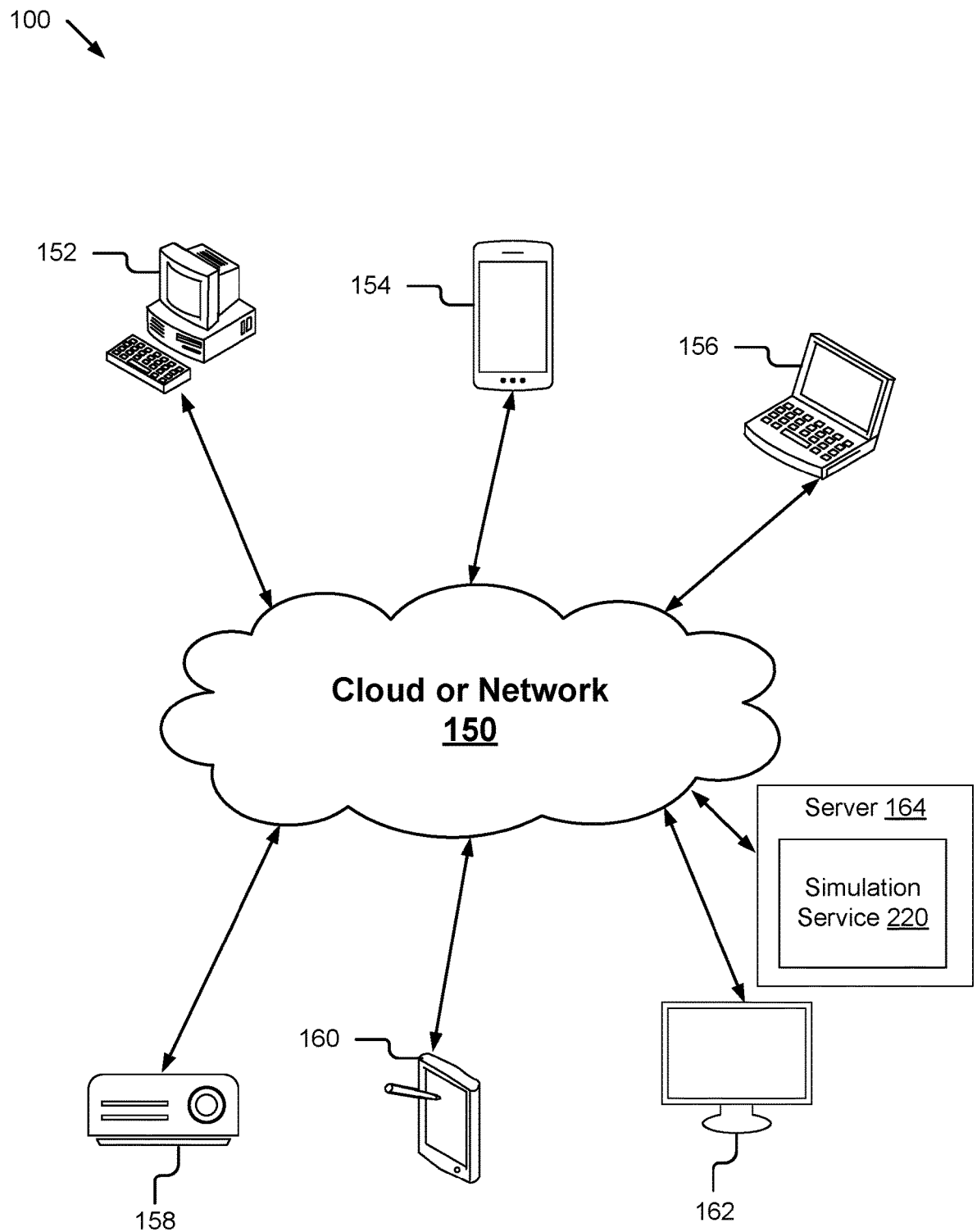
FIG. 1 is a block diagram of an example implementation of a system for building simultaneous interactive experiences according to one embodiment.

FIG. 1 is a block diagram of an example system 100 for building simultaneous interactive experiences including various components including a simultaneous interactive experience server 164. In this example implementation, the system 100 includes a cloud or network 150, a desktop computer 152, a smart phone 154, a laptop computer 156, a projector 158, a tablet computer 160, a monitor or television 162, and the simultaneous interactive experience server 164. Although not shown, other client device types may also be coupled to the network 150 and interact with the simultaneous interactive experience server 164. The simultaneous interactive experience server 164 is described in more detail below with reference to FIG. 2.

The network 150 may be a conventional type, wired or wireless, and may have numerous different configurations including a star configuration, token ring configuration or other configurations. Furthermore, the network 150 may include a local area network (LAN), a wide area network (WAN) (e.g., the Internet), and/or other interconnected data paths across which multiple devices may communicate. In some implementations, the network 150 may be a peer-to-peer network. The network 150 may also be coupled to or includes portions of a telecommunications network for sending data in a variety of different communication protocols. In some implementations, the network 150 includes Bluetooth communication networks or a cellular communications network for sending and receiving data including via short messaging service (SMS), multimedia messaging service (MMS), hypertext transfer protocol (HTTP), direct data connection, wireless access protocol (WAP), email, etc. In addition, although FIG. 1 illustrates a single network 150 coupled to the client devices 152-162 and the server 164 in practice one or more networks 150 may be connected to these entities.

The client devices 152-162 in FIG. 1 are used by way of example. Although six client devices are illustrated, the disclosure applies to a system architecture having any number of client devices available to any number of users. In the illustrated implementation, the client devices 152-162 are communicatively coupled to the network 150 via respective signal lines. Additionally, it should be understood that there may be more, fewer or different client devices that shown in FIG. 1. For example, the client devices (any or all of them) can be any computing device that includes a memory and a processor, as described in more detail below with reference to FIG. 2. For example, the client device can be a laptop computer, a desktop computer, a tablet computer, a mobile telephone, a smart phone, a personal digital assistant, a mobile email device, a portable game player, a portable music player, an AR or VR headset, a television with one or more processors embedded therein or coupled thereto or any other electronic device capable of accessing the network 150, etc.

While not shown, a client device may include an application. For example, a laptop 156 and desktop 152 may include a cloud application, and a tablet 160 and mobile phone 154 may include a mobile application 213 for interacting with the simulation service 220 and providing the features and functionality of the simulation service 220 described below with reference to FIGS. 3A-15B. For example, these applications correspond to devices having displays on which information may be present by the server 164. The one or more applications 103 interact with the triggers, and the triggers initiate how they communicate with each other and the server 164.

The server 164 is illustrated by way of example. While a single server 164 is illustrated the disclosure applies to a system architecture having one or more servers 164 (virtual or physical), distributed (e.g. cloud) or local.

Figure 2:
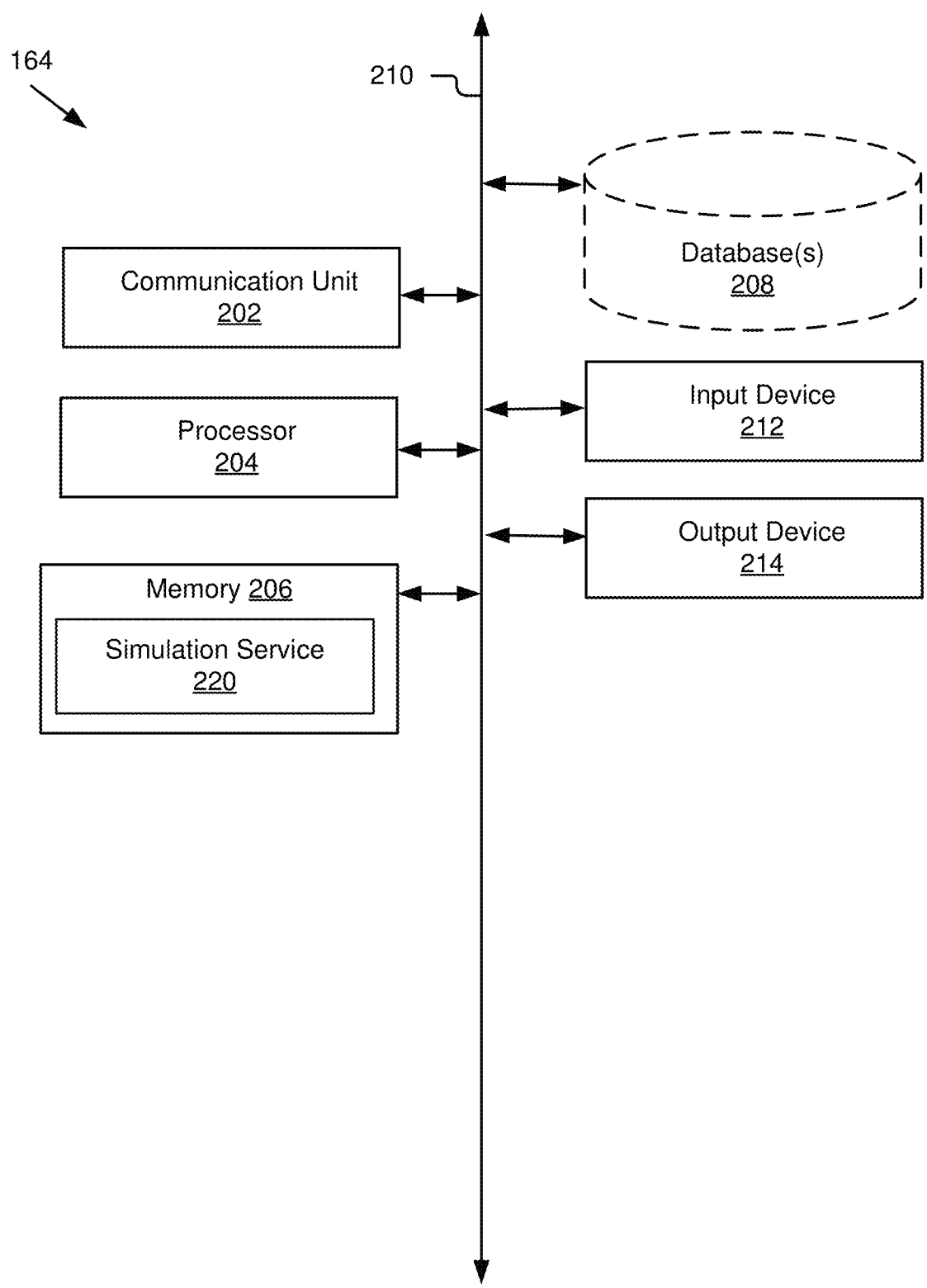
FIG. 2 is a block diagram of an example implementation of a server for building simultaneous interactive experiences according to one embodiment.

FIG. 2 is a block diagram of an example simultaneous interactive experience server 164. As illustrated in FIG. 2, the server 164 may include a communication unit 202, a processor 204, a memory 206, database(s) 208, an input device 212, and an output device 214, which may be communicatively coupled by a communication bus 210. The server 164 depicted in FIG. 2 is provided by way of example and it should be understood that it may take other forms and include additional or fewer components without departing from the scope of the present disclosure. For instance, various components of the computing device may be coupled for communication using a variety of communication protocols and/or technologies including, for instance, communication buses, software communication mechanisms, computer networks, etc. While not shown, the server 164 may include various operating systems, sensors, additional processors, and other physical configurations. The communication unit 202, processor 204, memory 206, etc., are representative of one or more of these components.

The communication unit 202 may include one or more interface devices (I/F) for wired and wireless connectivity among the components of the system 100. For instance, the communication unit 202 may include, but is not limited to, various types known connectivity and interface options. The communication unit 202 may be coupled to the other components of server 164 via the bus 210. The communication unit 202 can provide other connections to the network 150 and to other entities of the system 100 using various standard communication protocols.

In some embodiments, the communication unit 202 includes a wireless transceiver for exchanging data with other entities, or any other communication channel using one or more wireless communication methods, such as IEEE 802.11, IEEE 802.16, BLUETOOTH® or another suitable wireless communication method.

In some embodiments, the communication unit 202 includes a cellular communications transceiver for sending and receiving data over a cellular communications network such as via short messaging service (SMS), multimedia messaging service (MMS), hypertext transfer pro (HTTP), direct data connection, WAP, e-mail or another suitable type of electronic communication. In some embodiments, the communication unit 202 includes a wired port and a wireless transceiver. The communication unit 202 also provides other conventional connections to the network for distribution of files and/or media objects using standard network protocols such as TCP/IP, HTTP, HTTPS and SMTP as will be understood to those skilled in the art.

The processor 204 comprises an arithmetic logic unit, a microprocessor, a general-purpose controller or some other processor array to perform computations and provide electronic display signals to a display device. The processor 204 may be coupled to the bus 210 for communication with the other components. The processor 204 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors (physical or virtual) may be included. The processing capability might be enough to perform complex tasks, including various types of feature extraction and matching.

The memory 206 stores instructions and/or data that may be executed by processor 204. The memory 206 is coupled to the bus 210 for communication with the other components. The instructions and/or data may comprise code for performing any and/or all of the techniques described herein. The memory 206 may be a dynamic random-access memory (DRAM) device, a static random-access memory (SRAM) device, flash memory or some other memory device known in the art. In some embodiments, the memory 206 also includes a non-volatile memory or similar permanent storage device and media such as a hard disk drive, a floppy disk drive, a CD ROM device, a DVD ROM device, a DVD RAM device, a DVD RW device, a flash memory device, or some other mass storage device known in the art for storing information on a more permanent basis. The simulation service 220 may be stored in the memory 206 and cause the processor 204 to execute its functionality in some implementations.

The database(s) 208 may include information sources for storing and providing access to data. In some implementations, database(s) 208 may store data associated with a database management system (DBMS) operable on the server 164. For example, the DBMS could include a structured query language (SQL) DBMS, a NoSQL DBMS, various combinations thereof, etc. In some instances, the DBMS may store data in multi-dimensional tables comprised of rows and columns, and manipulate, (e.g., insert, query, update and/or delete), rows of data using programmatic operations.

The database(s) 208 may be included in the server 164 or in another computing system and/or storage system distinct from but coupled to or accessible by server 164. The database(s) 208 can include one or more non-transitory computer-readable mediums for storing the data. In some implementations, the database(s) 208 may be incorporated with the memory 206 or may be distinct therefrom.

The input device 212 may include any device for inputting information into the server 164. In some embodiments, the input device 212 may include one or more peripheral devices. For example, the input device 212 may include a keyboard, a pointing device, microphone, an image/video capture device (e.g., camera), a touch-screen display integrated with the output device 214, etc. The output device 214 may be any device capable of outputting information from the server 164. The output device 214 may include one or more of a display (LCD, OLED, etc.), a printer, a haptic device, an audio reproduction device, a touch-screen display, a remote computing device, etc. In some implementations, the output device is a display which may display electronic images and data output by a processor of the server 164 for presentation to a user, such as the processor 204 or another dedicated processor.

The bus 210 can include a communication bus for transferring data between components of a computing device or between computing devices, a network bus system including the network 150 or portions thereof, a processor mesh, a combination thereof, etc. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The components 202, 204, 206, 208, 212, and/or 214 may be communicatively coupled by bus 210 and/or processor 204 to one another and/or the other components of the server 164. In some implementations, the components 103, 105, 202, 204, 206, 208, 212, and/or 214 may include computer logic (e.g., software logic, hardware logic, etc.) executable by the processor 204 to provide their acts and/or functionality. In any of the foregoing implementations, these components 202, 204, 206, 208, 212, and/or 214 may be adapted for cooperation and communication with processor 204 and the other components of the server 164.

It should be obvious that FIG. 2 is merely one example, and one skilled in the art should understand that other processors, operating systems, sensors, displays and physical configurations are possible and within the scope of this description.

Figure 3:
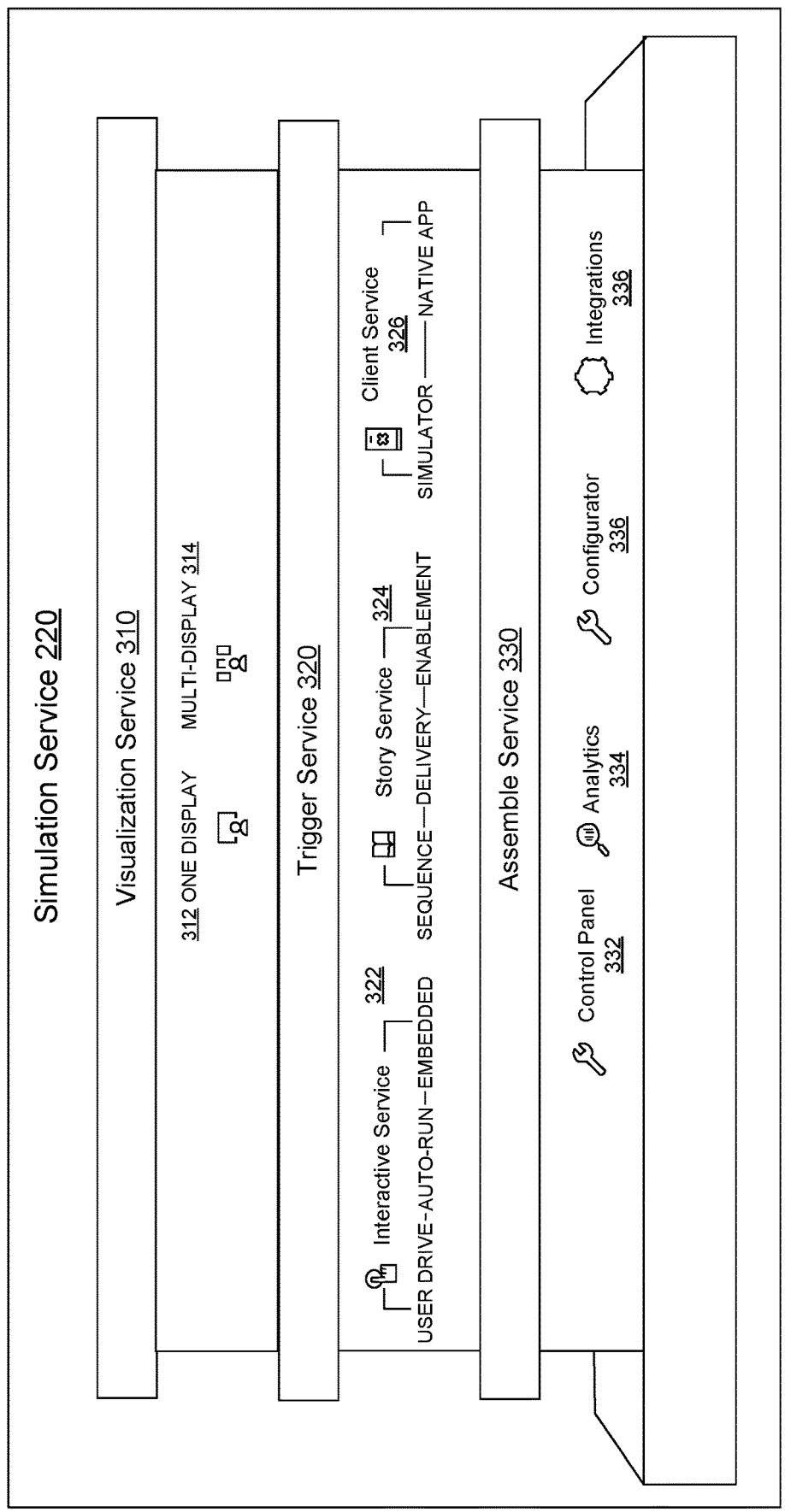
FIG. 3 is a block diagram illustrating example simulation service that is part of the system for building simultaneous interactive experiences according to one embodiment.

FIG. 3 is a block diagram illustrating an example simulation service 220 for building simultaneous interactive experiences. In one embodiment, the simulation service 220 is a cloud-based platform that builds the visualization of the user experience in the context of the business impact. Using the simulation service 220 one may take the most powerful use cases and bring them to life, thereby showing the benefit to key stakeholders and the alignment to the business bottom line. The simulation service 220 enables visualizations for multiple user experiences and drives interactions across each experience showing the collective vision and experience of the integrated product vision. These interactive digital experiences are occasionally referred to as simulations.

In one embodiment, the simulation service 220 is a set of integrated services that enables the simulation of technology and product experiences across N number of displays and with N number of interactions. In one embodiment, the simulation service 220 is accessible by one or more client devices. In one embodiment, the simulation service 220 and its features and functionality are accessible to the one or more client devices via one or more of a cloud application (not shown) or mobile application (not shown).

In the illustrated embodiment, the simulation service 220 includes a visualization service 310, a trigger service 320, and an assemble service 330. For clarity and convenience, it may be beneficial to discuss the components 310, 320, and 330 and their subcomponents 312, 314, 322, 324, 326, 332, 334, 336, and 338 in the context of an example, in which a simulation is created, presented, and modified using the simulation service 220. To better map to the narrative of such an example and for clarity, the components 310, 320, 330 and their subcomponents 312, 314, 322, 324, 326, 332, 334, 336, and 338 are discussed in an order that differs from the numerical order of the reference numbers assigned to the components in FIG. 3.

The trigger service 320 generates a simulation. In the illustrated embodiment, the trigger service 320 includes an interactive service 322, a story service 324, and a client service 326. In one embodiment, a simulation generated by the simulation service 220 includes one or more sequences associated with content. In some embodiments, a sequence is associated with a use case (e.g. process, feature, or functionality) that a presenting user may wish to demonstrate in a subsequent presentation of the simulation.

The story service 324 receives content to be presented during the simulation presentation and one or more sequences. In one embodiment, the content may include one or more of audio, video, images (e.g. screen grabs), or text (e.g. copy), etc. files or pointers to such content. In one embodiment, the story service 324 receives content by uploading the content to the server 164, and the simulation service 220 presents the content during a simulation (e.g. responsive to a trigger, as described below).

Referring now to FIG. 4A, an example user interface (UI) 400 for receiving a sequence and associated content is illustrated according to one embodiment. At field 402, the name of the sequence is entered. A sequence may be associated with a use case (e.g. process, feature, or functionality) that a presenting user may wish to demonstrate in a subsequent presentation of the simulation after completion of the development of the simulation. In the illustrated embodiment of FIG. 4A, the sequence name is defined as "Setup." Field 404 is a sequence ID used by the code of the simulation service 220 to identify the sequence (e.g. "setup," unique alphanumeric ID, etc.).

In portion 406 of the UI 400 options relating to the visualization of the presentation of the simulation may be input. For example, as illustrated, a user may select a visualization with three panels or two panels, and the user has selected a two-panel visualization. Since the two-panel visualization is selected, the middle portion of the UI displays a section 408 for receiving input defining content (e.g. media for upload, a URL, simulated user interface, etc.) associated with the left panel, and section 410 for receiving input defining content associated with the right panel. The panels are also occasionally referred to herein as displays. As discussed further below with reference to the visualization service 310 the panels/displays may, at the time of presentation, be presented on physically separate displays (e.g. separate display monitors) or different portions of a single display (e.g. left half of the monitor and right half of the monitor) or a combination thereof.

Figure 4B:
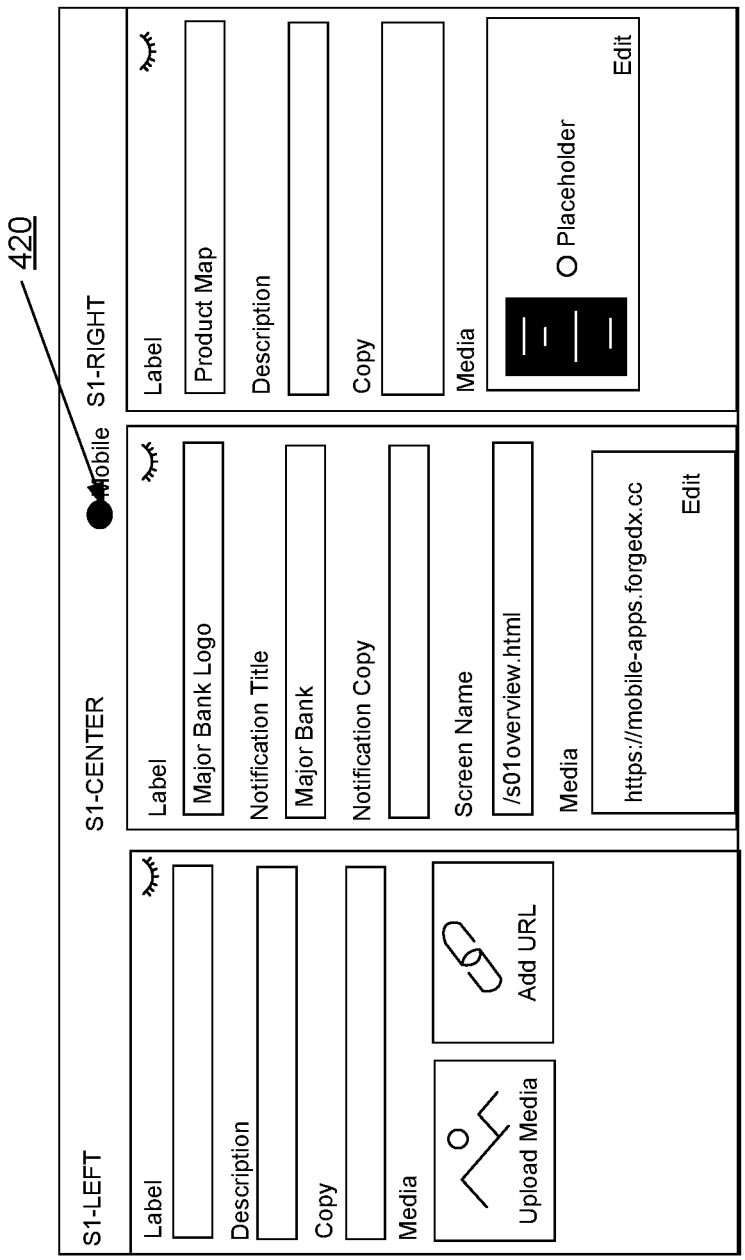

In the illustrated UI 400, the content associated with a panel may be associated with a label, description, and copy. When the three-panel option is selected, the user interface includes three sections, as illustrated in FIG. 4B, for defining content—one section for defining content for each of the three panels. Also, in FIG. 4B a toggle 420 has been selected indicating that the center panel is associated with content from a mobile application (e.g. a mobile application associated with the simulation services 220 platform and run on a presenting user's phone to drive the simulation and/or mirror the presenting user's phone screen).

In one embodiment, multiple versions of content may be associated with a panel. For example, a first version of an image may be uploaded in a vertical orientation and a second version may be uploaded in a horizontal orientation. In one embodiment, the story service 320 receives decision logic (e.g. to determine whether to display a vertically oriented version or a horizontally oriented version, or to determine whether to present soccer-related content because the simulation is being run in Europe vs Football-related content because the simulation is being presented in the U.S.).

Referring again to FIG. 4A, at field 412, a script may be input. In one embodiment, the script is presented to a presenting user during presentation of the simulation, for example, as illustrated in section 612 of FIG. 6. In section 414, an interaction, or interactions, may be defined. The complexity of a sequences may vary based on the user's input during development. For example, a simple sequence may merely display content (e.g. a single graphic) and a complex sequence may define an ordered list of N interactions (e.g. receive X alert, scroll, press on X menu, select Y option, enter Z text, press enter, etc.) and a set of content for presentation.

The interactive service 322 receives definitions of interactions mapped to a sequence including a trigger, receives interactions during a simulation, and triggers a visualization within the simulation. A trigger defines a set of simultaneous actions across digital components. In one embodiment, a trigger initiates interaction or display changes across any medium including cloud and mobile. In one embodiment, a trigger is a non-linear function that allows a presenter/user to use triggers to visualize the user, business and customer interactions at the same time. While triggers typically align with a use case that is being presented, the presenter can jump between triggers while they are presenting the simulation. The mapping of a user case to a set of sequences and one or more interactions including a trigger using the interactive service 322 and story service 324 is occasionally referred to as mapping a simulated use case to a trigger set.

Referring now to FIGS. 5A-C, a representation of trigger data determined from the inputs to the story service 324 and interactive service 322 is displayed. FIGS. 5A and 5B represent trigger data associated with a two-panel/two-display simulation, and FIG. 5C is a representation of trigger data associated with a three-panel/three-display simulation in which the center simulates a mobile application display. While FIGS. 5A-C illustrate tables, the trigger data is not necessarily stored or maintained in a table, spreadsheet, or relational data structure as illustrated. Other data structures including additional or different information (e.g. columns) are within the scope of this disclosure. In some embodiments, the trigger data is integrated into a JSON package when building the simulation and deployed to the cloud.

Figure 6:
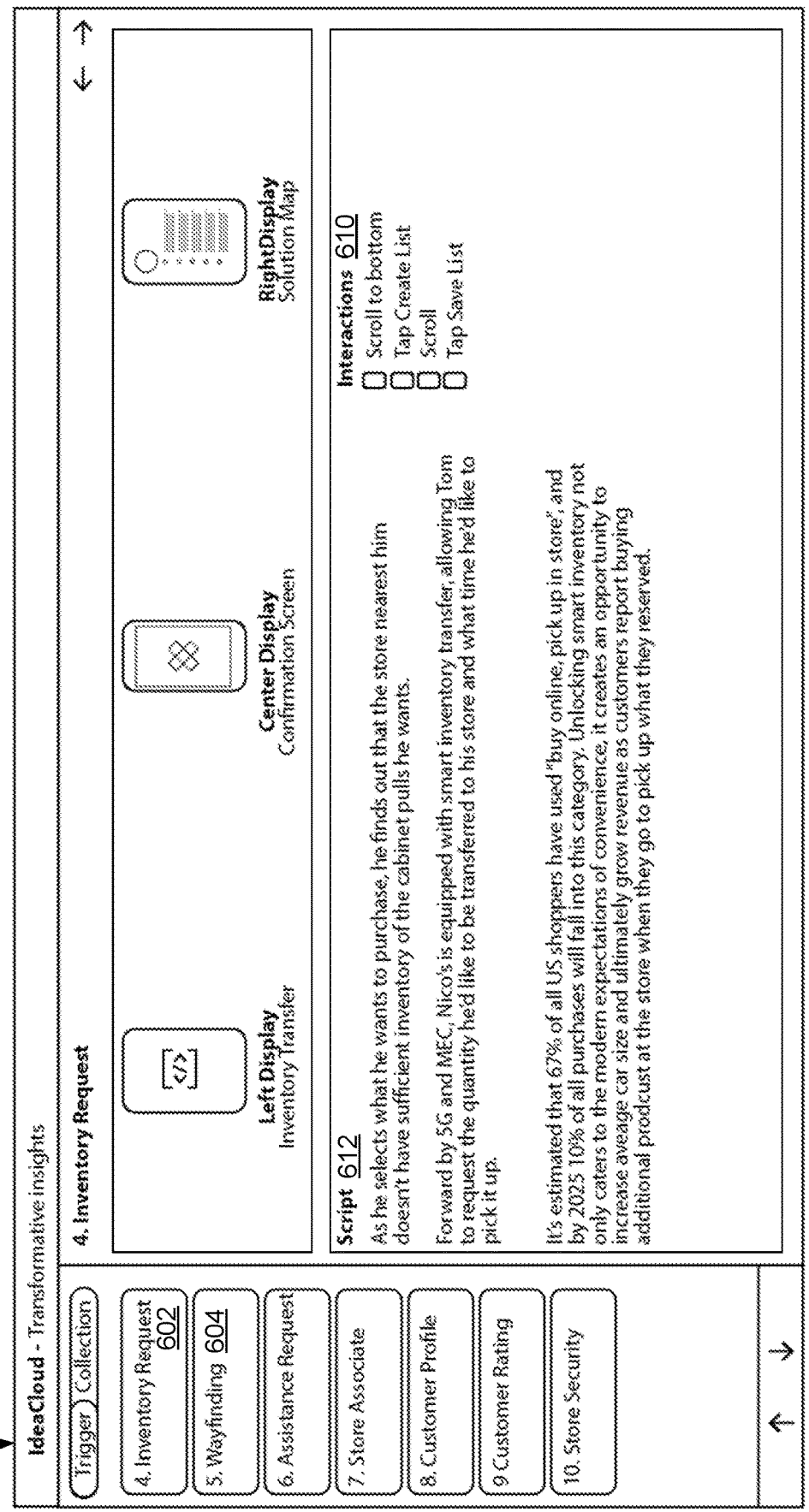
FIG. 6 is an illustration of an example user interface for a control panel according to one embodiment.

In some embodiments, a trigger is a type of interaction. In one example, a trigger is the last interaction defined in a sequence and triggers the next sequence in the simulation. For example, referring to FIG. 6, an example user interface 600 is illustrated according to one embodiment, in the illustrated example, four interactions 610 are associated with the "Inventory Request" sequence 602. In one embodiment, assume that once the interaction "Tap Save List" is performed during presentation of the simulation, the simulation proceeds to "Wayfinding" 604 and one or more of the left display, center display, and right display are updated based on the "Wayfinding" sequence. Therefore, "Tap Save List" is a trigger in this example. FIG. 6 also includes a script 612 associated with sequence 602. In one embodiment, the script 612 was input, during simulation creation, into a field analogous to 412 of FIG. 4A.

In one embodiment, the relative ordering of the sequences (e.g. 602 and 604) may be modified by a presenting user or by the system itself. For example, a presenting user may customize the simulation for himself/herself to arrange the sequences is an order he/she prefers. In another example, the system for example, based on analysis performed by the analytics 334 module discussed below may order the sequences in a simulation or suggest an order of sequences (e.g. based on the user, or other user's, prior presentation order).

In some embodiments, a trigger is a type of interaction that causes inter-panel (or inter-display) modification. For example, the first three interactions listed—scroll to bottom, tap crate list, and scroll—are associated with and modify the visualization of the center display/panel (mobile phone app. as illustrated in FIG. 6). However, once the "Tap Save List" interaction is received one or more of the content on the right display and the content on the left display is modified. Selecting a sequence (e.g. selecting "Inventory Request" 602) may also serve as a trigger.

In some implementations, the mobile application is accessed using a mobile device. The interactions can either be driven by triggers from the cloud application or by being embedded in the mobile app on the mobile device. The mobile app can also drive interactions in the cloud application based on the experience that is created using the simulation service 220.

In some implementations, a cloud application has defined areas for content that interacts together by clicking on triggers. A trigger in the cloud app can automatically cause an action on another area of content or the mobile app. Triggers can be embedded in any content area of the cloud application to drive the experience. The cloud application integrates any number of the services to build the experience—trigger service 320, story service 324, interactive service 322, and client service 326.

Depending on the embodiment, a trigger can be activated, transition to the next set of interactions, by any number of activation points such as a control panel or navigation or standard interaction in a website or mobile app, using a separate device to operate the trigger or by interaction in the cloud or mobile app., etc.

FIG. 6 is an example of a control panel. A presenter may select and trigger the sequences in the left column. In one embodiment, the presenter may elect to skip or execute the sequences in any desired order. In one embodiment, the presenter triggers the event manually, e.g. by manually performing the interactions. For example, the presenter, on a mobile phone, manually scrolls and taps the mobile phone screen (or provides other user input into a client device). In one embodiment, the presenter may decide to auto run the interactions, wherein the interactions are automatically input or executed by the system 100. In another embodiment, the presenter may trigger sequences by selection a graphic element (e.g. a dot) during the presentation or tapping on a touchscreen to trigger the next sequence The client service 326 receive interactions when a simulation is presented and communicates with interactive service 322 to drive the simulation. For example, the client service 326 receives taps, swipes, gestures, clicks, etc. from a presenting user's client device (e.g. a VR headset, mobile phone, computer, tablet, touchscreen, etc.) and provides those to the interactive service 322.

To summarize and simplify, in some embodiments the trigger service 320, among other things, creates an id, defines what and where the interaction needs to be called, defines which content should drive which interaction, embeds the trigger into the content whether cloud or mobile so the trigger may be selected any time.

The visualization service 310 sends for display on one or more client devices visualizations associated with a simulation. In one embodiment, the visualization service 310 includes a one display 312 visualizer and a multi-display 314 visualizer. Using the visualization service 310, the simulation may be presented on one display or multiple displays based on a visualization selected during one or more of creation of the simulation (e.g. whether a multi-display version was requested or created during development) and presentation of the simulation (e.g. whether a presenting user requests to use multi-display).

Figure 7:
FIG. 7 illustrates an example user interface displaying a marketing experience simulation for selection by a presenter according to one embodiment.

The number of client devices on which the simulation is displayed, the types of devices, and the physical arrangement of devices may vary based on the embodiment or use case. For example, referring to FIG. 7, a market experience simulation for "Magento Commerce" is illustrated. In one embodiment, a marketing experience is limited to one display capability. FIG. 7 displays no visualizers options, but displays the ability to embed simulation code (e.g. so that the simulation may be accessed through a browser window or website).

Figure 8:
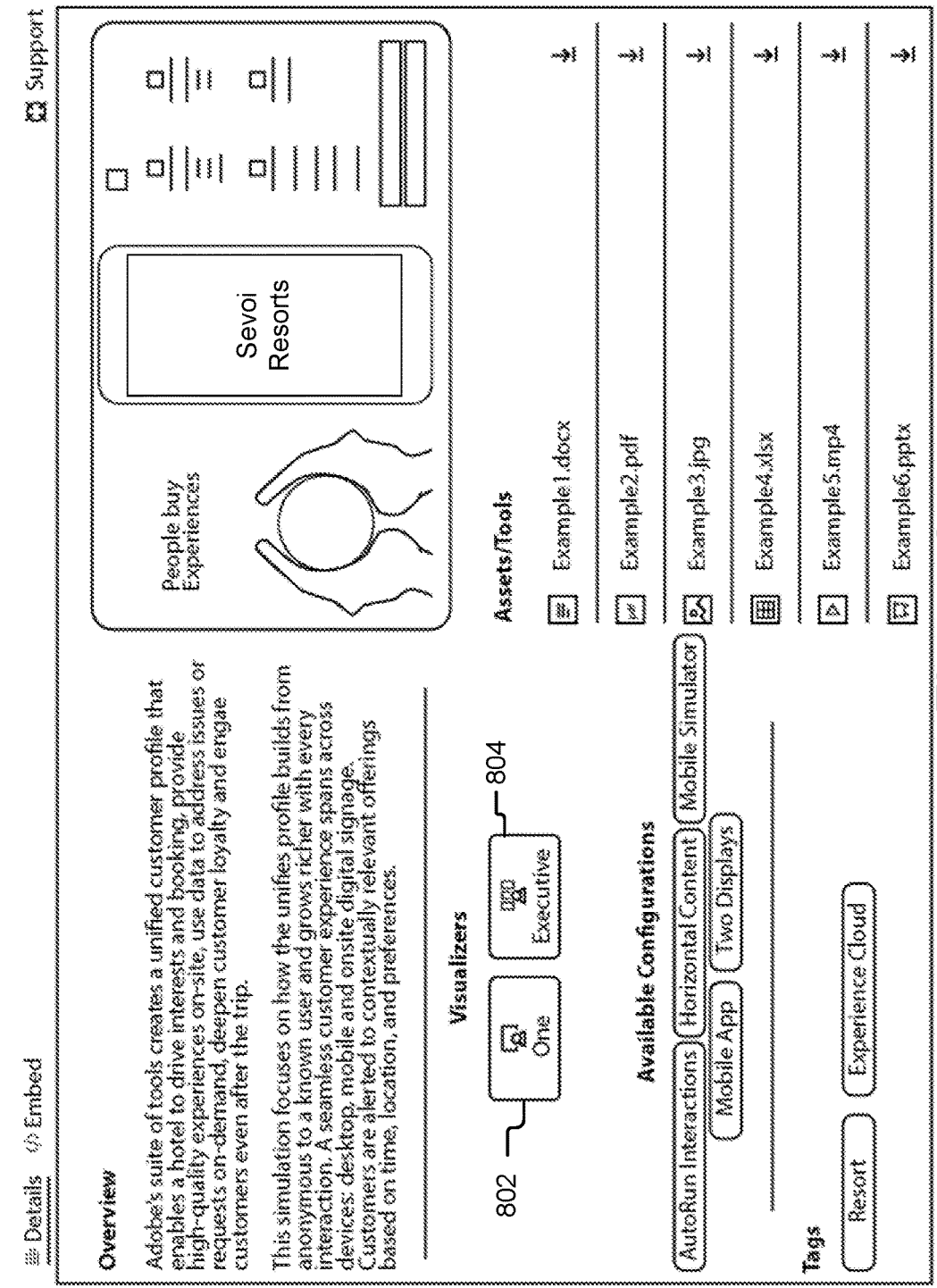
FIG. 8 illustrates an example user interface displaying an account experience simulation for selection and presentation by a presenter according to one embodiment

By contrast, some implementations, when a simulation generated using the simulation service 220 is going to be presented, a user (e.g. a presenter in this scenario) is able to select a type of visualization based on the number of display devices on which the simulation will be visualized. For example, FIG. 8 illustrates an example user interface 800 of an account experience (as the simulation appears to be customized for "sevoi") simulation according to one embodiment. In one embodiment, UI 800 is displayed to a presenting user for selection and presentation of the associated simulation by the presenting user. Depending in part on the resources available to the presenter (e.g. whether multiple display devices are available), the presenting user may elect to use a one display visualizer 802 or multi-display (occasionally referred to a "Executive") visualizer 314, by selecting either graphical element 802 or 804, respectively.

Figure 9:
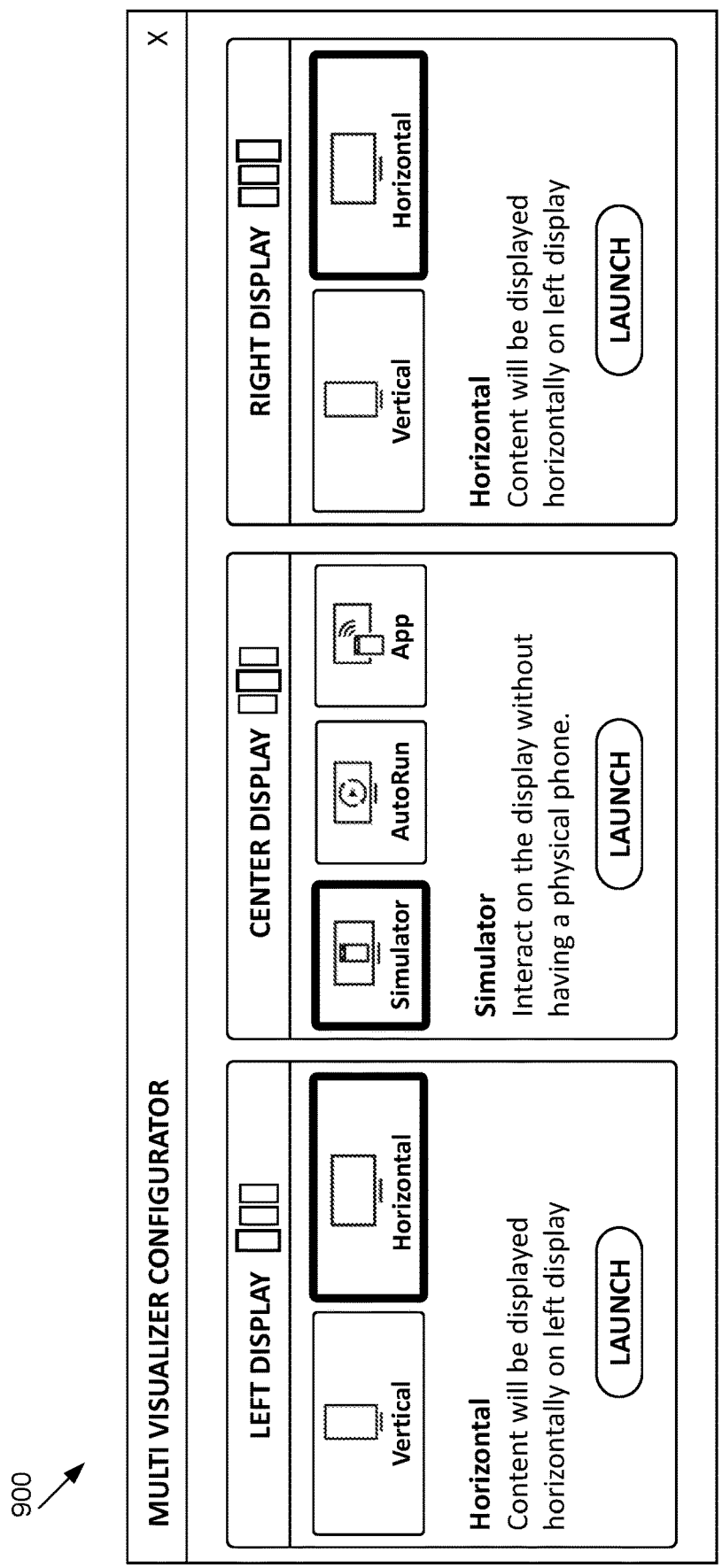
FIG. 9 illustrates an example user interface for a multi-display visualizer according to one embodiment.
Figure 10:
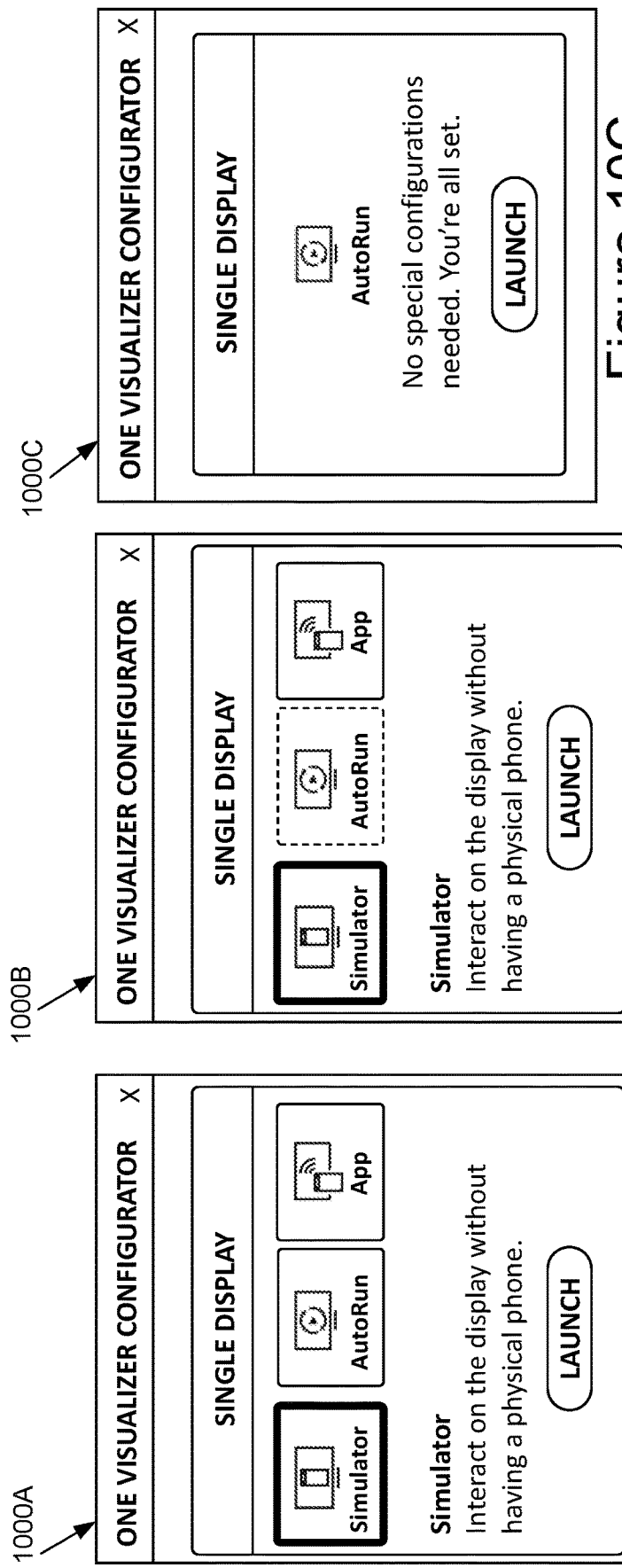
FIG. 10A-C illustrate an example user interfaces for a one visualizer according to some embodiments.

In one embodiment, responsive to the user selecting the multi-display visualizer element 804 in FIG. 8, the UI 900 of FIG. 9 is presented to the user. In this example, the simulation includes three panels, and the presenting user, via UI 900, indicated the orientation of the left display device, and the right display device. In association with the center display, multiple presentation configurations are presented for selection. The presentation configurations are discussed in more detail below with reference to the configurator 336 of FIG. 3. However, FIG. 9 illustrates that the AutoRun configuration is unavailable. A configuration may be unavailable for a number of reasons including, but not limited to, (1) the simulation pre-dates the configuration, (2) the configuration is not enabled for the presenting user or the presenting user's company not subscribing to, selecting, or enabling a particular configuration type.

In one embodiment, responsive to the presenting user selecting the one-display visualizer element 802 in FIG. 8 (e.g. because only a single projector is available at the venue in which he/she is presenting), a one visualizer configurator UI is presented examples of which are illustrated in FIGS. 10A-C. Depending on the available or enabled presentation configurations (e.g. simulator, autorun, live) or combination thereof, the one visualizer configurator UI may vary. For example, FIG. 10A illustrates an instance in which simulator, autorun, and live are available for the selected presentation. FIG. 10B illustrates an instance in which simulator and live are available for the selected presentation. FIG. 10C illustrates an instance in which only AutoRun is available for the selected presentation.

In one embodiment, the visualization service 310 receives a request including an indication of whether one display or multi-display is requested (e.g. subsequent to user input selecting a user interface element, such as 802 or 804 of FIG. 8). In one embodiment, the visualization service 310 receives additional information. For example, the visualization service 310 receives a number of display devices, orientation of the display devices (e.g. whether each display device is landscape/horizontal, or portrait/vertical), physical arrangement of the display devices (e.g. left display, center display, right display), etc. and presents the simulation based on that information.

FIG. 11 is an example user interface 1100 of a presentation of an example simulation according to one embodiment. The UI 1100 includes three panels 1102, 1104, and 1106. The three panels are illustrated on a single display device (e.g. a large monitor); therefore, the presenter selected to use a one display visualizer 312. In the left panel 1102, a user interface presented on a tablet or phone to an employee of Nico's hardware is illustrated. In the UI of the left panel 112, a long dwell time alert has been triggered because a customer identified as "Tom Samo satisfied a long dwell time condition by lingering in the tool depart—aisle 8. The UI of the left panel 1102 also displays the available sales associates, their assigned departments, and their and Tom's location in the store on a floor plan. In the center panel 1104, a user interface presented on a tablet or phone of a customer named Tom is illustrated. The alert in the employee's app of the left panel has triggered the center panel, to display a chat window with a message inquiring as to whether Tom would like assistance. "Yes" has been typed as Tom's response in the middle frame 1104. It is unclear from looking at FIG. 11 whether (1) the presenter is mirroring his/her phone to the center panel and has typed "yes into his/her phone (live configuration), (2) is using a laptop to drive the presentation and typed "yes" into the laptop, which then simulated the screen of the mobile phone (i.e. simulator), or (3) whether the "Yes" was automatically entered by the system (i.e. autorun). In the right panel 1106, different aspects and benefits of the simulated technology are presented.

In the illustrated embodiment, the assemble service 330 includes control panel 332, analytics 334, configurator 336, and integrations 338 modules.

The control panel 332 The control panel has the ability to drive the simulation through multiple points of integration. The control panel also enables the simulation to be driven by activating a trigger (e.g. sequence 602 in FIG. 6) in any order and allows the activation of any trigger at any time. FIG. 6, which was discussed above, illustrated one example UI of a control panel. In the control panel UI 600, selecting a sequence (e.g. 602) may activate a trigger. Depending on the configuration, the interactions 610 listed may need to be input by the presenter into a phone (i.e. live configuration), entered via another device (e.g. simulator configuration), or may be automatically executed (i.e. AutoRun configuration). The presenter may decide to present the sequences in the left column, including 602 and 604 in any order. Therefore, should a presenter decide that the inventory request functionality is less interesting to the audience, the presenter may select to skip its presentation and present wayfinding first or instead. This allows the presentation of the simulation to be dynamic and adapt to the audience or over time as a presenter learns which features are of the most interest to audiences.

Referring again to FIG. 3, the configurator 336 enables one or more presentation configurations to be associated with a simulation and presented, receives a selection of a presentation configuration from a presenting user, and executes the requested presentation configuration. In one embodiment, the configurator enables one or more of a simulator presentation configuration, an autorun presentation configuration, and a live presentation configuration.

Simulator presents a simulated application on a screen without having to use the device on which the simulated application runs. For example, assume the simulated application is a mobile application; in one embodiment, the multi-display visualizer 314 presents the mobile experience on a center display which presents visualization of a mobile phone running the mobile application. However, interactions are manually driven with mouse clicks on a presenter's device rather than touchscreen inputs on a mobile phone into a mobile application. Simulator may be more stable than casting the mobile device's screen to the center display, particularly in low bandwidth environments.

Autorun, similar to simulator, presents a simulated application on a screen without having to use the device on which the simulated application runs. However, while simulator receives manual input interactions (e.g. when a presenter mouse clicks on first element, then scrolls down and clicks on second graphical element), autorun automatically performs the interactions associated with a given trigger responsive to activating an autorun element associated with a trigger. Autorun may be more stable because, similar to simulator, there is no casting the, e.g., mobile device's screen to the center display, which may be problematic in low bandwidth environments. Additionally, autorun may be beneficial by allowing a presenter to focus telling the overall story while running the simulation rather than focusing on the actual input of interactions allowing a presenter that is unfamiliar with the associated interactions to confidently and competently present features and functionality in the simulation.

Live reflects a presenter's device's screen for presentation. For example, a presenter interacts with his or her mobile phone scrolling and tapping in a mobile application, and the display of that device is cast for presentation on another display (e.g. monitor) or portion thereof. In one embodiment, the configurator 336 communicates with the client service 326 to receive the interactions from the presenter's client device (e.g. mobile phone), and with the visualization service 310 to cast a visualization of the presenter's client device's screen to another device (e.g. a projector) for presentation.

In one embodiment, the configurator 336 allows a presenting user to personalize how the user will interact with simulation and drive a simulation (e.g. via interactions and triggers). For example, the simulation is manually driven (e.g. through manual user input interactions, e.g., taps, clicks, scrolls, etc.), automatically driven (e.g. automatically executing a set of one or more interactions), or a combination thereof. In one embodiment, how the simulation is driven is determined on a per-simulation basis, such that the selection applies to all components of the simulation (i.e. sequence(s), interaction(s), trigger(s)). In one such embodiment, the live, simulator, and autorun presentation configurations discussed may be selected at the beginning of a presentation, and applied to that presentation of the simulation.

In one embodiment, the configurator 336 provides more granular control, so that a user may select to manually or automatically drive individual or sets of sequences, interactions, triggers, or a combination thereof. In some embodiments, a user's selections may be stored as a user profile and applied to future presentations by that user. For example, the profile may store that presenting user A prefers to autorun sequence A, and autorun interactions 1-4 of sequence 1, but manually input interactions 5-8 of sequence 2. Such individual personalization allows multiple presenters to use the same simulation, but customize the presentation to their individual style, preference, or audience(s).

The integrations 338 module provides integration into various data sources to receive data therefrom. For example, the integrations 338 may include integrations into one or more of a live environment, a virtual environment, a $3^{rd}$ party digital environment, etc. In one embodiment, the integrations 338 enable the simulation services 220 to receive data from one or more environments and generate and maintain multi-environment user experience data, which is described below with reference to the analytics 334 module and FIG. 15B.

Examples of a live environment include, by way of example, and not by limitation, include live events such as conferences, key note addresses, breakout sessions, in-person meetings, conventions, etc. Live environment data is data relating to or generated from a live event. Examples of live environment data include, by way of example, and not limitation, attendee information (e.g. list of individuals registered to attend a conference or individual breakout session, e-mail distribution list for calendar invite for presentation, attendees based on iBeacon, geofence, GPS coordinates, or other data indicating physical presence of device, etc.), audience feedback (e.g. audience interaction with the simulation, or data related to live voting on which feature is demonstrated or in what order), duration of attendance, at the live event, etc.

Examples of a virtual environment include, by way of example, and not by limitation, virtual interactions such as watch parties, video conference meetings, visiting a website with an embedded simulation or viewed the simulation, etc. Virtual environment data is data relating to or generated from a virtual event. Examples of virtual environment data include, by way of example, and not limitation, attendee information (e.g. identifying users that attended an online watch party or video conference), identification of users that visited a webpage with an embedded simulation, and contextual information about those individuals and/or their devices (e.g. geographic location, MAC address, what portions of virtual event they attended, etc.).

Examples of $3^{rd}$ party digital environments include, by way of example, and not by limitation, social media platforms (e.g. Facebook, LinkedIn, twitter, etc.), customer relationship management platforms, etc. $3^{rd}$ party digital environment data is data relating to or generated from a third-party digital environment. Examples of $3^{rd}$ party digital environment data include, by way of example, and not limitation, identification of individuals that viewed the company's social media page, mentions of the company or simulated product (e.g. tweets or news articles), contact lists of customers or potential customers, etc.

The analytics 334 module collects and analyzes data. In one embodiment, the analytics 334 module collects, and makes available, simulation user experience data describing what users experience and how they are engaged with one or more simulations. In one embodiment, a simulation user experience datum includes an interaction, a time, and a context. The data describing interaction describes a user's interaction with a simulation. Examples of the interaction may include by way of example and not limitation an interaction received, a trigger received, a sequence executed, a visualizer or configuration requested, a termination of a simulation, logins, etc. The time is data describing a timing of the interaction in the datum. Examples of a time include, but are not limited to, a time stamp, a time period (Q1 sales or July 2020), a duration (e.g. viewed simulation for X seconds), or event (Conference Y 2020). The context data describes the context of the interaction. Examples of context include, by way of example and not limitation, an identification of the user with whom the interaction is associated (e.g. who if presenting the simulation), identification of the audience (e.g. to whom is the simulation being presented), where is the simulation associated with the interaction being presented (e.g. may be based on IP address, MAC address, GPS coordinates, network, etc.), how many times has the simulation or a particular sequence/feature been presented, what portion(s) of the presentation did the presenter complete, etc. In one embodiment, the interactions are not limited to a presenter's interactions with the simulation, and include audience interaction. For example, the audience may vote (e.g. was the play a touch down) as part of the simulation, and those interactions would generate simulation user experience data.

The analytics 334 module analyzes the simulation user experience data, and may provide valuable insights. For example, analysis of simulation user experience data for a single simulation may provide insights as to the features that are most interesting, most presented, most likely to result in the termination of a simulation, most presented by the most successful presenter(s), etc. In another example, analysis of simulation user experience data associated with a single entity (e.g. across all simulations for a company that demos its products using the simulation service 220) may provide insights as to bright spots or weak spots on their presentation team (e.g. based on number or frequency of a presenter's presentations), who is most interested in the simulated product offerings, where the greatest interest lies geography or industry or use case-wise exists, etc. In yet another example, the analysis of simulation user experience data platform-wide (which may be anonymized) may provide insight into the most used, most successful features, ROI based on usage, etc.

In one embodiment, the analytics 334 module collects, and makes available, multi-environment user experience data describing what users experience and how they are engaged with the simulation and outside the simulation. In one embodiment, multi-environment user experience includes data describing interactions, a time of those interactions, and a context of those interactions. As there are multiple environments (e.g. simulation, live, virtual, and 3$^{rd}$ party digital), the interactions and contexts may be are more varied and complex, but the analysis may provide better insights as to how what users experience and how they are engaging with the simulation and outside the simulation. For example, the analysis may discount users terminating a simulation early when those users that previously attended a conference that presented the simulation, so that the machine learning does not incorrectly conclude that a use case or sequence in the simulation is uninteresting/to be avoided/or moved to the end of the simulation based on terminations by such users. In another example, the analysis may determine using social media posts (e.g. from 3$^{rd}$ party digital environments received view the integrations 338) and through simulation user experience data that a particular use case or sequence is interesting and generating successful outcomes.

The data analyzed may vary depending on the embodiment and the use cases. In one embodiment, the analytics 334 module applies analysis logic to multi-environment user experience data. In one embodiment, the analysis logic includes machine learning, and the simulation service 220 modifies a simulation based on the analysis. For example, the analytics 334 may determine that feature A be simulated after feature B or that feature B always be presented in the simulation, based on analysis of the multi-environment user experience data indicating, e.g., that sales realizations increase when feature B is presented, or that simulations are more frequently terminated after presentation feature A, so feature B should be presented first so that it is seen, or that feature B is garnering buzz (e.g. via analysis of social media posts). In another example, the analytics 334 may determine that there is a great deal of interest outside the U.S., and may modify the simulation to insert decision logic so that the simulation, when presented to a European audience is more relevant (e.g. the simulation may identify and use content to simulate the use cases in the context of a soccer team rather than for an American football team, which may be used in the simulation for the U.S. market. In another example, the same trigger may lead a user down a different path based on context. For example, trigger A may lead to feature 1 if the user is in Europe, and to feature 2 if the user is located in the United States.

In one embodiment, the simulation service 220 recommends or takes an action based on the analysis. For example, the simulation service 220 sends an e-mail to an individual in the audience, when a simulation was presented, requesting to put the individual in contact with a sales representative or to arrange a more in-depth demonstration.

For clarity and convenience, throughout this description, use cases of the analytics 334 module, and outcomes therefrom, are discussed by way of example and not limitation. Therefore, it should be understood that the analytics 334 module may perform multiple analyses and make various conclusions, for example, based on user experience data. Accordingly, the data preparation (e.g. which data to extract from the raw data, data munging, division into training, validation, and test data sets, etc.), types of analysis (e.g. supervised, semi-supervised, or unsupervised machine learning), the specific algorithms (e.g. random forest, gradient boosting, classification, clustering, etc.), scoring of algorithm performance, etc. may vary based on the data used and the use case and these variations are within the scope of this description. In one embodiment, the analytics 334 generates actionable data, as a result of the analysis/application of the analysis logic to one or more of the multi-environment and simulation user experience data. Depending on the embodiment, actionable data may be passed to CRM platforms for further action including outbound marketing emails, telemarketing, or social marketing. Additionally, actionable data may be transferred to web analytics platforms for analysis through web and event performance metrics. This may include passing data to platforms such as Google analytics and other similar platforms.

Figure 12:
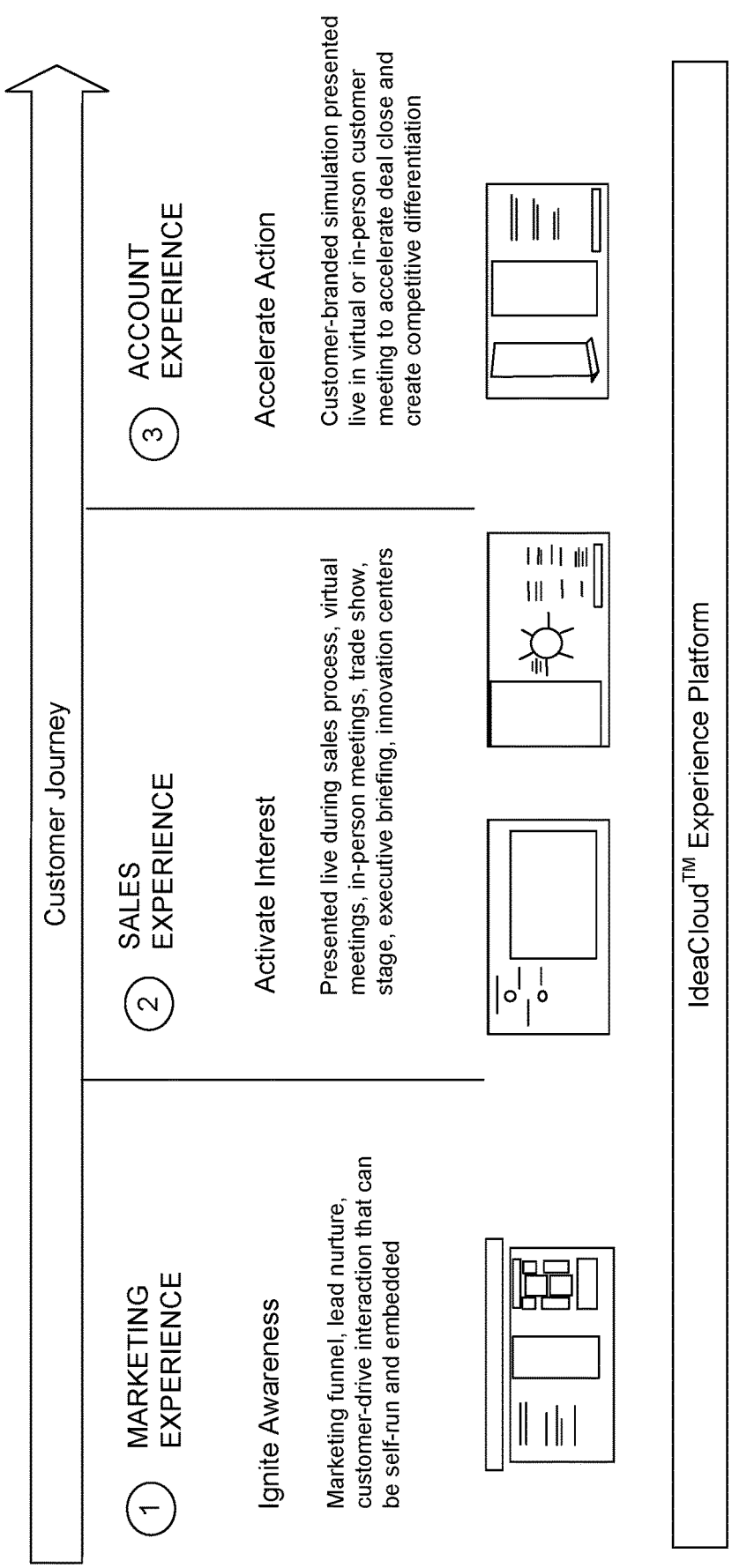
FIG. 12 illustrates an example of a customer's journey according to one embodiment.

FIG. 12 illustrates an example of a customer's journey and illustrates the adaptive nature of the simulation service 220. Specifically, FIG. 12 highlights how a simulation may also be modified and extended so that a high-level or generic simulation that may be self-run or embedded (i.e. a marketing experience) may be further developed, the simulation may then be modified or extended for presentation at a trade show (e.g. sales experience), and then customized such as branded for a particular customer (i.e. account experience). This reduces duplication of efforts and allows use of a common platform throughout the process.

Example Methods

Figure 13:
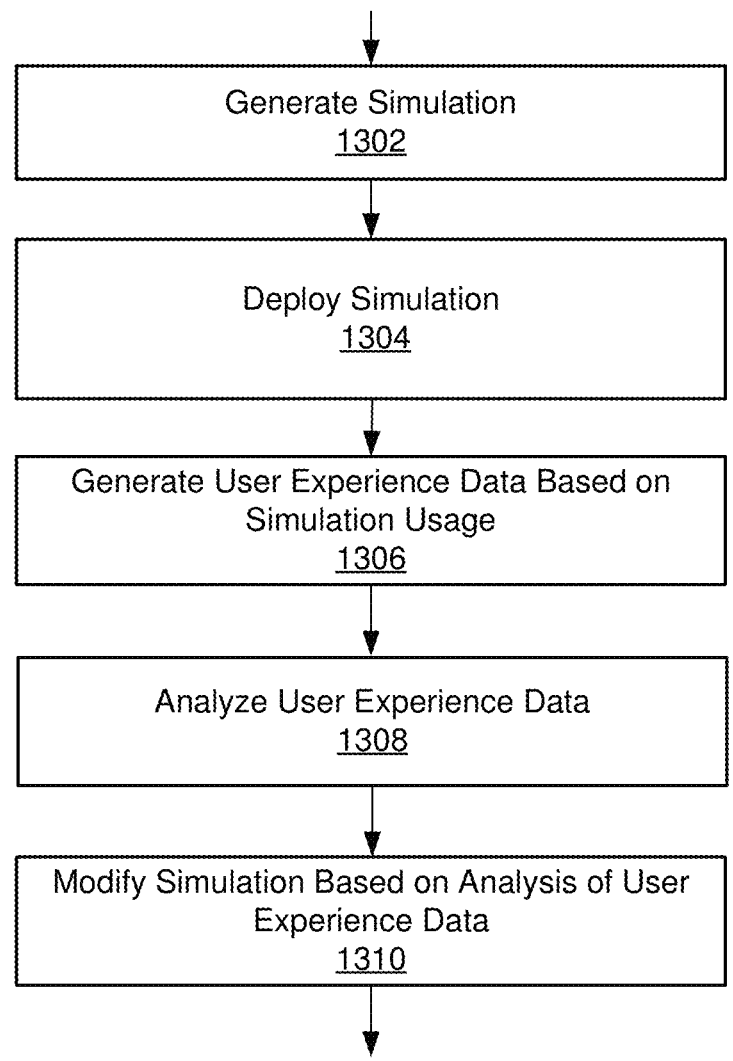
FIG. 13 illustrates an example method for building and maintaining a simultaneous interactive experience according to one embodiment.

FIG. 13 is a flowchart of an example method 1300 for building and maintaining a simultaneous interactive experience. The method 1300 begins at block 1302. At block 1302, the simulation service 220 generates a simulation. At block 1304, the simulation service 220 deploys the simulation. For example, the simulation is deployed online (e.g. for access via a cloud application or mobile application) or offline. In another example, the simulation is deployed for presentation using one or more visualizers (e.g. one or multi) or using one or more presentation configurations (e.g. simulator, autorun, live). At block 1306, the simulation service 220 generates user experience data based on simulation usage. For example, data regarding interactions (e.g. triggers, specifically), their timing and context is generated from user interaction with one or more simulations. At block 1308, the simulation service 220 analyzes the user experience data. At block 1310, the simulation service 220 modifies a simulation based on the analysis of the user experience data at block 1310.

Figure 14:
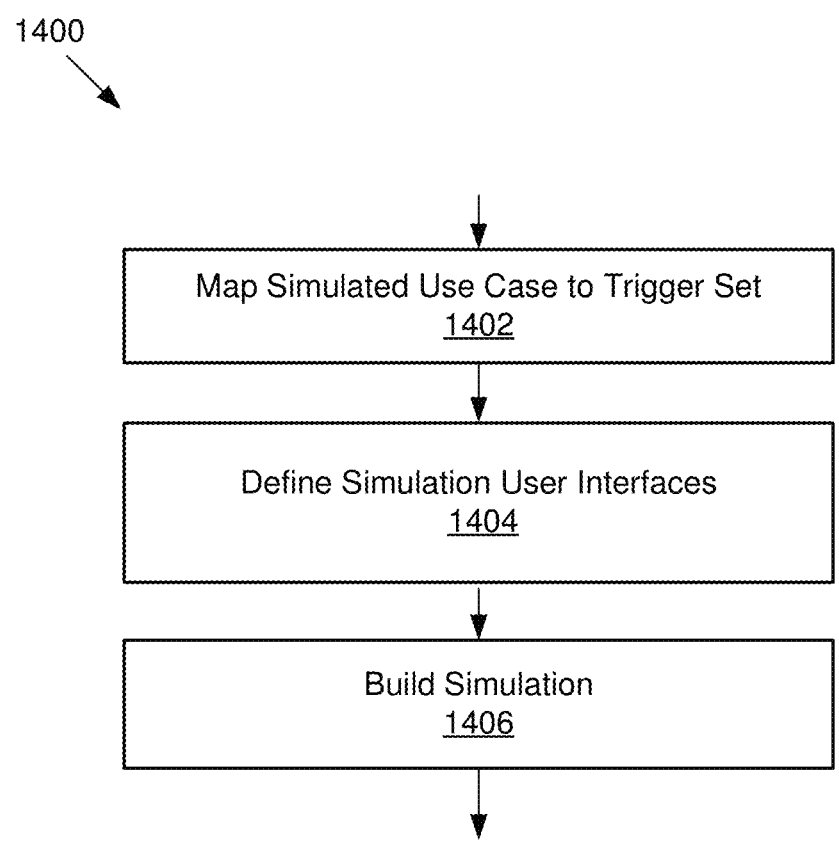
FIG. 14 illustrates an example method for building a simultaneous interactive experience according to one embodiment.

FIG. 14 is a flowchart of an example method 1400 for building a simultaneous interactive experience. The method 1400 begins at block 1402. At block 1402, the trigger service 320 maps a simulated use case to a trigger set based on user input. For example, the story service 324 and receives a set of sequences and a set of interactions, the set of interactions including one or more triggers. At block 1404, the trigger service 320 defines a set of simulation user interfaces. For example, the story service 324 receives one or more of content and decision logic associated with the content. At block 1406, the simulation service 220 builds a simulation. For example, the simulation service 220 renders a unique package of code associated with the simulation (e.g. a JSON package and instances of the content uploaded). In some embodiments, the simulation that is built at block 1406 is configurable without re-building or building a new simulation. For example, users may customize aspects such as an order of sequences within the simulation, triggers between sequences, how the simulation is driven (e.g. what aspects are driven through manual input and which are autorun), etc.

Figure 15A:
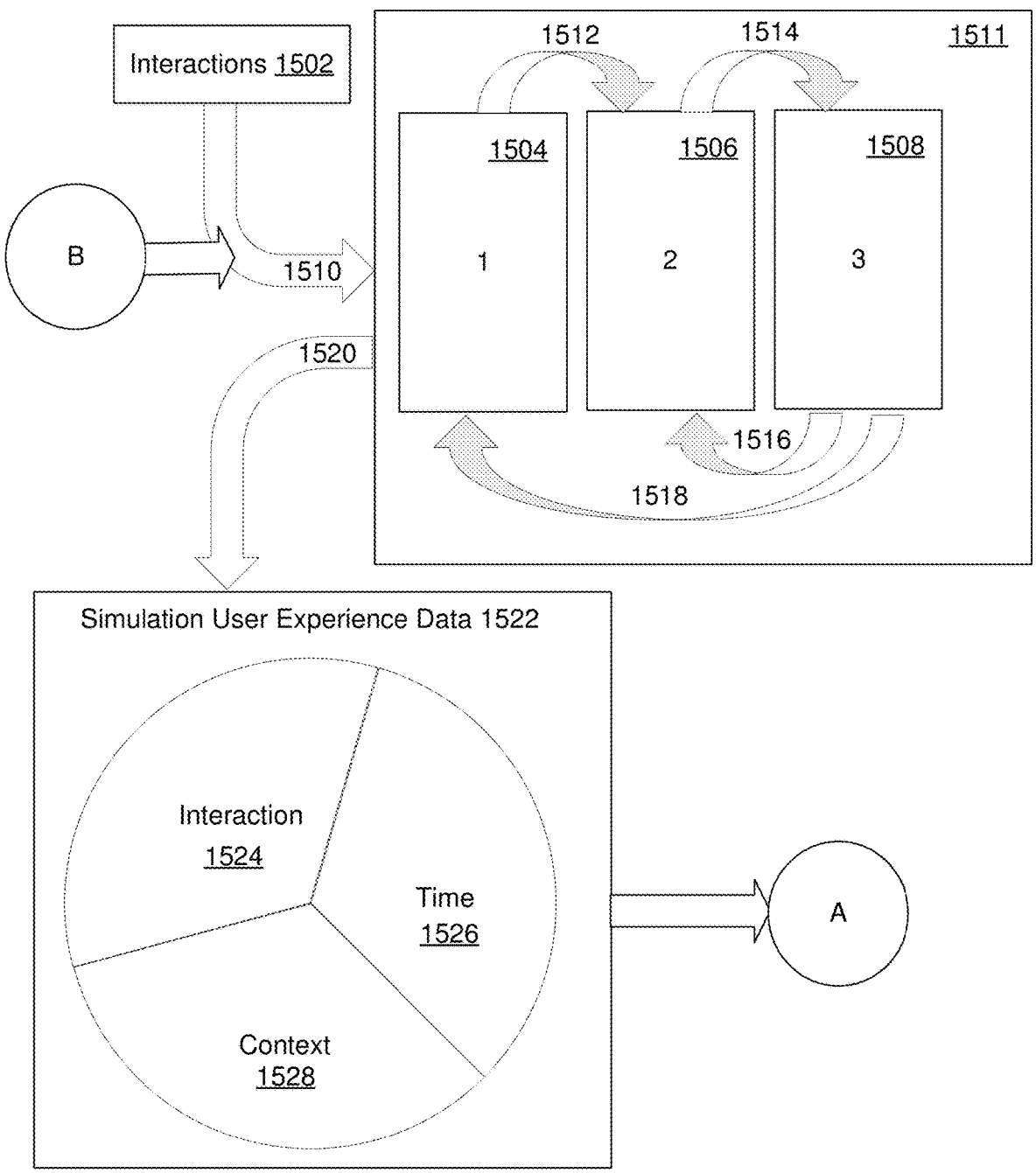
FIGS. 15A-B are block diagrams illustrating an example of user experience data generation and usage according to one embodiment.
Figure 15B:
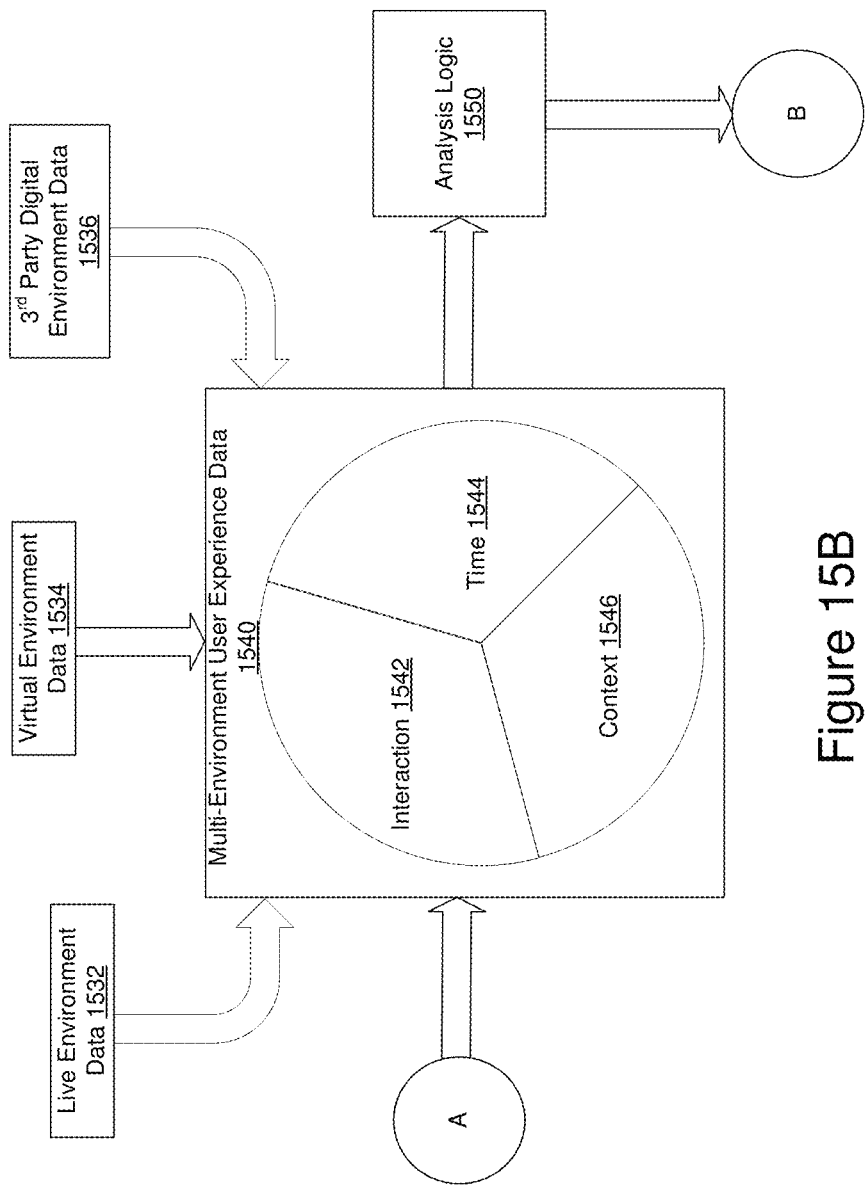

FIGS. 15A-B are block diagrams illustrating an example of user experience data generation and usage according to one embodiment. Referring to FIG. 15A, interactions 1502, for example triggers, are received, as indicated by arrow 1510. Box 1511 represents the simulation with three panels represented by boxes 1504, 1506, and 1508. The interactions 1502 include triggers that cause interaction between panels as illustrated by arrows 1512, 1514, 1516, and 1518. For example, a trigger associated with the first panel 1504 causes the content displayed on the second panel 1506 to change as represented by arrow 1512, and so forth. The interactions 1502, timing of the interactions 1526, and context of the interactions 1528 are received, collected, and organized as simulation user experience data 1522. The method then continues at "A" in FIG. 15B. In FIG. 15B, the simulation user experience data 1522 may be combined with data received from one or more of a live environment 1532, a virtual environment 1534, and a third party digital environment, to generate multi-environment user experience data. In one embodiment, the multi-environment user experience data includes interaction data 1542 from the various environments, as well as time data 1544 and context data 1546 for each of those interactions. In one embodiment, the multi-environment user experience data 1540 is used by the analysis logic 1550 of the analytics module 334 to generate actionable data. Actionable data may be passed to CRM platforms (not shown) for further action including outbound marketing emails, telemarketing, or social marketing. Additionally, actionable data may be transferred to web analytics platforms (not shown) for analysis through web and event performance metrics. This may include passing data to platforms (not shown) such as Google analytics and other similar platforms. In one embodiment, the multi-environment user experience data 1540 is used by the analysis logic 1550 of the analytics module 334 to generate one or more of an insight (e.g. identifying a most popular feature in the sequence), a modification to the simulation (e.g. changing a trigger, rearranging an order of sequences, generating decision logic, etc.), and an action (e.g. making a recommendation, sending an e-mail to a customer, etc.)

Other Considerations

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMS), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked as a kernel loadable module, as a device driver, and/or in every and any other way known now or in the future. Additionally, the disclosure is in no way limited to implementation in any specific programming language, or for any specific operating system or environment.

What is claimed is:

1. A method comprising:
receiving, using one or more processors, a set of sequences including a first sequence, the set of sequences associated with an interactive simulation of an application and one or more of features and functionality of the application, wherein users of the interactive simulation of the application include a first user having a first user role and a second user having a second user role;
receiving, using the one or more processors, a set of content associated with the first sequence, the set of content including first content including a first simulated user interface presented to the first user associated with the first user role in the interactive simulation of the application, the first content associated with a first panel, the set of content further including second content including a second simulated user interface presented to the second user associated with the second user role in the interactive simulation of the application, the second content associated with a second panel;
receiving, using the one or more processors, a definition of a set of interactions associated with the first sequence, the set of interactions including a first trigger, wherein the first trigger is a last interaction associated with the first sequence and wherein receipt of the first trigger, during presentation of the interactive simulation, triggers a next sequence included in the set of sequences;
generating, using the one or more processors, the interactive simulation based on the received set of sequences, the set of content, and the definition of the set of interactions, wherein, during presentation of the interactive simulation, the first content is presented in the first panel and the second content is simultaneously presented in the second panel, and wherein the first panel is displayed in a first display area and the second panel is simultaneously displayed in a second display area that is distinct from the first display area;
receiving, during presentation of the interactive simulation, a first interaction representing interaction by the first user with the first simulated user interface that is presented in the first panel, wherein the first interaction is selected by a presenter of the interactive simulation and responsive to audience interest; and
responsive to the first interaction being the first trigger, presenting third content in the second panel, wherein, based on user definition prior to generating the interactive simulation, content presented in the first panel may be updated to fourth content or remain as the first content.

2. The method of claim 1 further comprising:
determining, based on user input, whether to (a) present the first panel and the second panel using a single display device, wherein the first display area and the second display area are distinct portions of a display area of the single display device, or to (b) present the first panel using a first display device and the second panel using a second display device, wherein the first display area is a display area of the first display device and the second display area is a display area of the second display device; and
presenting the first panel and the second panel based on the determination.

3. The method of claim 1 further comprising:
collecting data regarding interactions with the interactive simulation;
generating simulation user experience data, wherein generating simulation user experience data includes supplementing the data regarding interactions with the interactive simulation with timing data and context data; and
generating actionable data based on an analysis of the simulation user experience data.

4. The method of claim 1 further comprising:
collecting data regarding interactions with the interactive simulation;
generating simulation user experience data, wherein generating simulation user experience data includes supplementing the data regarding interactions with the interactive simulation with timing data and context data; and
generating multi-environment user experience data by combining the simulation user experience data with data received from one or more of a variety of environments including a live environment, a virtual environment, and a third party digital environment, the multi-environment user experience data including data regarding interactions in the variety of environments as well as timing data and context data corresponding to the interactions; and generating actionable data based on an analysis of the multi-environment user experience data.

5. The method of claim 1, wherein the first trigger is based on a manual user input, by the presenter, via a client device, the client device being used, at least in part to drive the interactive simulation.

6. The method of claim 1, wherein, responsive to receiving the first trigger, a set of actions is automatically executed as part of the interactive simulation.

7. The method of claim 1, wherein, based on user input indicating a preference, one or more of (A) a first subset within the set of sequences is responsive to manual user input, by the presenter, via a client device during presentation of the interactive simulation, (B) a first subset within the set of interactions associated with the first sequence is responsive to manual user input, by the presenter, via a client device during presentation of the interactive simulation, and (C) the first trigger is responsive to manual user input, by the presenter, via a client device during presentation of the interactive simulation; and wherein one or more of (a) a second subset within the set of sequences is automatically executed during presentation of the interactive simulation, (b) a second subset within the set of interactions associated with the first sequence is automatically executed during presentation of the interactive simulation, and (c) a second trigger is automatically executed.

8. The method of claim 1, wherein, based on simulation user experience data describing prior usage of the interactive simulation by one or more users, one or more of (A) a first subset within the set of sequences is responsive to manual user input, by the presenter, via a client device during presentation of the interactive simulation, (B) a first subset within the set of interactions associated with the first sequence is responsive to manual user input, by the presenter, via a client device during presentation of the interactive simulation, and (C) the first trigger is responsive to manual user input, by the presenter, via a client device during presentation of the interactive simulation; and wherein one or more of (a) a second subset within the set of sequences is automatically executed during presentation of the interactive simulation, (b) a second subset within the set of interactions associated with the first sequence is automatically executed during presentation of the interactive simulation, and (c) a second trigger is automatically executed during presentation of the interactive simulation.

9. The method of claim 1 further comprising:
modifying one or more of an order of the set of sequences, the set of content, the set of interactions, and the first trigger based on analysis of multi-environment user experience data using machine learning.

10. The method of claim 1, wherein each trigger in the set of interactions is associated with a user-defined set of content, wherein user-defined content includes an identification of content to be displayed responsive to receipt of an associated trigger, and on which panel the identified content is to be displayed.

11. The method of claim 10, wherein the content to be displayed responsive to receipt of the associated trigger may modify, based on user definition and responsive to receipt of the associated trigger, what is presented in a subset of panels, the panels including the first panel and the second panel.

12. A system comprising:
one or more processors; and
a memory storing instructions that, when executed by the one or more processors, cause the system to:
receive a set of sequences including a first sequence, the set of sequences associated with an interactive simulation of an application and one or more of features and functionality of the application, wherein users of the interactive simulation of the application include a first user having a first user role and a second user having a second user role;
receive a set of content associated with the first sequence, the set of content including first content including a first simulated user interface presented to the first user associated with the first user role in the interactive simulation of the application, the first content associated with a first panel, the set of content further including second content including a second simulated user interface presented to the second user associated with the second user role in the interactive simulation of the application, the second content associated with a second panel;
receive a definition of a set of interactions associated with the first sequence, the set of interactions including a first trigger, wherein the first trigger is a last interaction associated with the first sequence and wherein receipt of the first trigger, during presentation of the interactive simulation, triggers a next sequence included in the set of sequences;
generate the interactive simulation based on the received set of sequences, the set of content, and the definition of the set of interactions, wherein, during presentation of the interactive simulation, the first content is presented in the first panel and the second content is simultaneously presented in the second panel, and wherein the first panel is displayed in a first display area and the second panel is simultaneously displayed in a second display area that is distinct from the first display area;
receive, during presentation of the interactive simulation, a first interaction representing interaction by the first user with the first simulated user interface that is presented in the first panel, wherein the first interaction is selected by a presenter of the interactive simulation and responsive to audience interest; and
responsive to the first interaction being the first trigger, presenting third content in the second panel, wherein, based on user definition prior to generating the interactive simulation, content presented in the first panel may be updated to fourth content or remain as the first content.

13. The system of claim 12, wherein the instructions, when executed by the one or more processors, further cause the system to:
determine, based on user input, whether to (a) present the first panel and the second panel using a single display device, wherein the first display area and the second display area are distinct portions of a display area of the single display device, or to (b) present the first panel using a first display device and the second panel using a second display device, wherein the first display area is a display area of the first display device and the second display area is a display area of the second display device; and
present the first panel and the second panel based on the determination.

14. The system of claim 12, wherein the instructions, when executed by the one or more processors, further cause the system to:

collect data regarding interactions with the interactive simulation;

generate simulation user experience data, wherein generating simulation user experience data includes supplementing the data regarding interactions with the interactive simulation with timing data and context data; and generate actionable data based on an analysis of the simulation user experience data.

15. The system of claim 12, wherein the instructions, when executed by the one or more processors, further cause the system to:

collect data regarding interactions with the interactive simulation;

generate simulation user experience data, wherein generating simulation user experience data includes supplementing the data regarding interactions with the interactive simulation with timing data and context data; and generate multi-environment user experience data by combining the simulation user experience data with data received from one or more of a variety of environments including a live environment, a virtual environment, and a third party digital environment, the multi-environment user experience data including data regarding interactions in the variety of environments as well as timing data and context data corresponding to the interactions; and generate actionable data based on an analysis of the multi-environment user experience data.

16. The system of claim 12, wherein the first trigger is based on a manual user input, by the presenter, via a client device, the client device being used, at least in part to drive the interactive simulation.

17. The system of claim 12, wherein, responsive to receiving the first trigger, a set of actions is automatically executed as part of the interactive simulation.

18. The system of claim 12, wherein, based on user input indicating a preference, one or more of (A) a first subset within the set of sequences is responsive to manual user input, by the presenter, via a client device during presentation of the interactive simulation, (B) a first subset within the set of interactions associated with the first sequence is responsive to manual user input, by the presenter, via a client device during presentation of the interactive simulation, and (C) the first trigger is responsive to manual user input, by the presenter, via a client device during presentation of the interactive simulation; and wherein one or more of (a) a second subset within the set of sequences is automatically executed during presentation of the interactive simulation, (b) a second subset within the set of interactions associated with the first sequence is automatically executed during presentation of the interactive simulation, and (c) a second trigger is automatically executed.

19. The system of claim 12, wherein, based on simulation user experience data describing prior usage of the interactive simulation by one or more users, one or more of (A) a first subset within the set of sequences is responsive to manual user input, by the presenter, via a client device during presentation of the interactive simulation, (B) a first subset within the set of interactions associated with the first sequence is responsive to manual user input, by the presenter, via a client device during presentation of the interactive simulation, and (C) the first trigger is responsive to manual user input, by the presenter, via a client device during presentation of the simulation; and wherein one or more of (a) a second subset within the set of sequences is automatically executed during presentation of the interactive simulation, (b) a second subset within the set of interactions associated with the first sequence is automatically executed during presentation of the interactive simulation, and (c) a second trigger is automatically executed during presentation of the interactive simulation.

20. The system of claim 12, wherein the instructions, when executed by the one or more processors, further cause the system to:

modify one or more of an order of the set of sequences, the set of content, the set of interactions, and the first trigger based on analysis of multi-environment user experience data using machine learning.

* * * * *